US012755888B2

(12) United States Patent
Yamamoto et al.

(10) Patent No.: US 12,755,888 B2
(45) Date of Patent: Oct. 6, 2026

(54) CORE PIECE, REACTOR, CONVERTER, AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinichiro Yamamoto, Mie (JP); Kazushi Kusawake, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 565 days.

(21) Appl. No.: 18/282,789

(22) PCT Filed: Mar. 11, 2022

(86) PCT No.: PCT/JP2022/010881
§ 371 (c)(1),
(2) Date: Sep. 19, 2023

(87) PCT Pub. No.: WO2022/209760
PCT Pub. Date: Oct. 6, 2022

(65) Prior Publication Data

US 2024/0161962 A1 May 16, 2024

(30) Foreign Application Priority Data

Mar. 29, 2021 (JP) ................................ 2021-056130

(51) Int. Cl.
*H01F 27/26* (2006.01)
*H01F 3/08* (2006.01)
(Continued)

(52) U.S. Cl.
CPC ............. *H01F 27/263* (2013.01); *H01F 3/08* (2013.01); *H01F 27/306* (2013.01); *H02M 3/003* (2021.05)

(58) Field of Classification Search
CPC .......... H01F 27/2804; H01F 1/24; H01F 5/06; H01F 27/022; H01F 27/29;
(Continued)

(56) References Cited

U.S. PATENT DOCUMENTS 3,183,461 A * 5/1965 Tipton .................... H01F 27/08
336/212
11,482,369 B2 * 10/2022 Nah .................... H01F 27/2823
(Continued)

FOREIGN PATENT DOCUMENTS

JP 2009-033055 A 2/2009

OTHER PUBLICATIONS

International Search Report issued on Jul. 5, 2022 for WO 2022/209760 A1 (4 pages).

*Primary Examiner* — Tuyen T Nguyen
(74) *Attorney, Agent, or Firm* — Venjuris, P.C.

(57) ABSTRACT

A core piece includes a middle core portion configured to be arranged inside a coil, and an end core portion configured to face an end face of the coil. The middle core portion includes a hole portion or a groove portion extending in an axial direction of the coil. In a lateral cross-section of the middle core portion, a radius of a first inscribed circle is less than or equal to 0.6 times a radius of a reference inscribed circle. The lateral cross-section is a cross-section of the middle core portion passing through the hole portion or the groove
(Continued)

portion along a plane orthogonal to the axial direction of the coil. The first inscribed circle is a largest inscribed circle between an outline of the hole portion or the groove portion in the lateral cross-section and a peripheral outline of the middle core portion in the lateral cross-section.

14 Claims, 14 Drawing Sheets

(51) Int. Cl.
*H01F 27/30* (2006.01)
*H02M 3/00* (2006.01)

(58) Field of Classification Search
CPC .. H01F 2027/2809; H01F 1/33; H01F 27/292; H01F 17/0013; H01F 27/32; H01F 27/263; H01F 3/08; H01F 27/306; H01F 27/255; H01F 37/00; H02M 3/003
USPC .................... 336/83, 192, 200, 212, 233–234
See application file for complete search history.

(56) References Cited

U.S. PATENT DOCUMENTS

| | | | | |
|---|---|---|---|---|
| 11,776,733 | B2 * | 10/2023 | Yoshikawa | H01F 27/306 336/65 |
| 2021/0134522 | A1 | 5/2021 | Kusawake et al. | |
| 2021/0398735 | A1 | 12/2021 | Yoshikawa | |

* cited by examiner

CORE PIECE, REACTOR, CONVERTER, AND POWER CONVERSION DEVICE

CROSS REFERENCE TO RELATED APPLICATIONS

This application is a national phase of PCT application No. PCT/JP2022/010881, filed on 11 Mar. 2022, which claims priority from Japanese patent application No. 2021-056130, filed on 29 Mar. 2021, all of which are incorporated herein by reference.

TECHNICAL FIELD

The present disclosure relates to a core piece, a reactor, a converter, and a power conversion device.

BACKGROUND

A reactor disclosed in Patent Document 1 includes a coil and a magnetic core. The magnetic core is configured by combining a plurality of core pieces. Some core pieces are constituted by a molded hardened body. A molded hardened body is a molded body of a composite material obtained by dispersing a soft magnetic powder in a resin.

PRIOR ART DOCUMENT

Patent Document

Patent Document 1: JP 2009-033055 A

SUMMARY OF THE INVENTION

A core piece according to an aspect of the present disclosure is a core piece constituted by a molded body of a composite material in which a soft magnetic powder is dispersed in a resin, the core piece including: a middle core portion configured to be arranged inside a coil; and an end core portion configured to face an end face of the coil, wherein the middle core portion includes a hole portion or a groove portion extending in an axial direction of the coil, and in a lateral cross-section of the middle core portion, a radius of a first inscribed circle is less than or equal to 0.6 times a radius of a reference inscribed circle, the lateral cross-section being a cross-section of the middle core portion passing through the hole portion or the groove portion along a plane orthogonal to the axial direction of the coil, the first inscribed circle being a largest inscribed circle between an outline of the hole portion or the groove portion in the lateral cross-section and a peripheral outline of the middle core portion in the lateral cross-section, the reference inscribed circle being a largest inscribed circle in a first virtual outline, and the first virtual outline being a smallest quadrilateral circumscribing the lateral cross-section.

A reactor according to an aspect of the present disclosure includes: a coil; and a magnetic core, wherein the coil includes one winding portion, the magnetic core is a compound body that is a combination of a first core piece and a second core piece, and at least either the first core piece or the second core piece is the core piece according to an aspect of the present disclosure.

A converter according to an aspect of the present disclosure includes the reactor according to an aspect of the present disclosure.

A power conversion device according to an aspect of the present disclosure includes the converter according to an aspect of the present disclosure.

DETAILED DESCRIPTION TO EXECUTE THE INVENTION

Problems to be Solved

Figure 1:
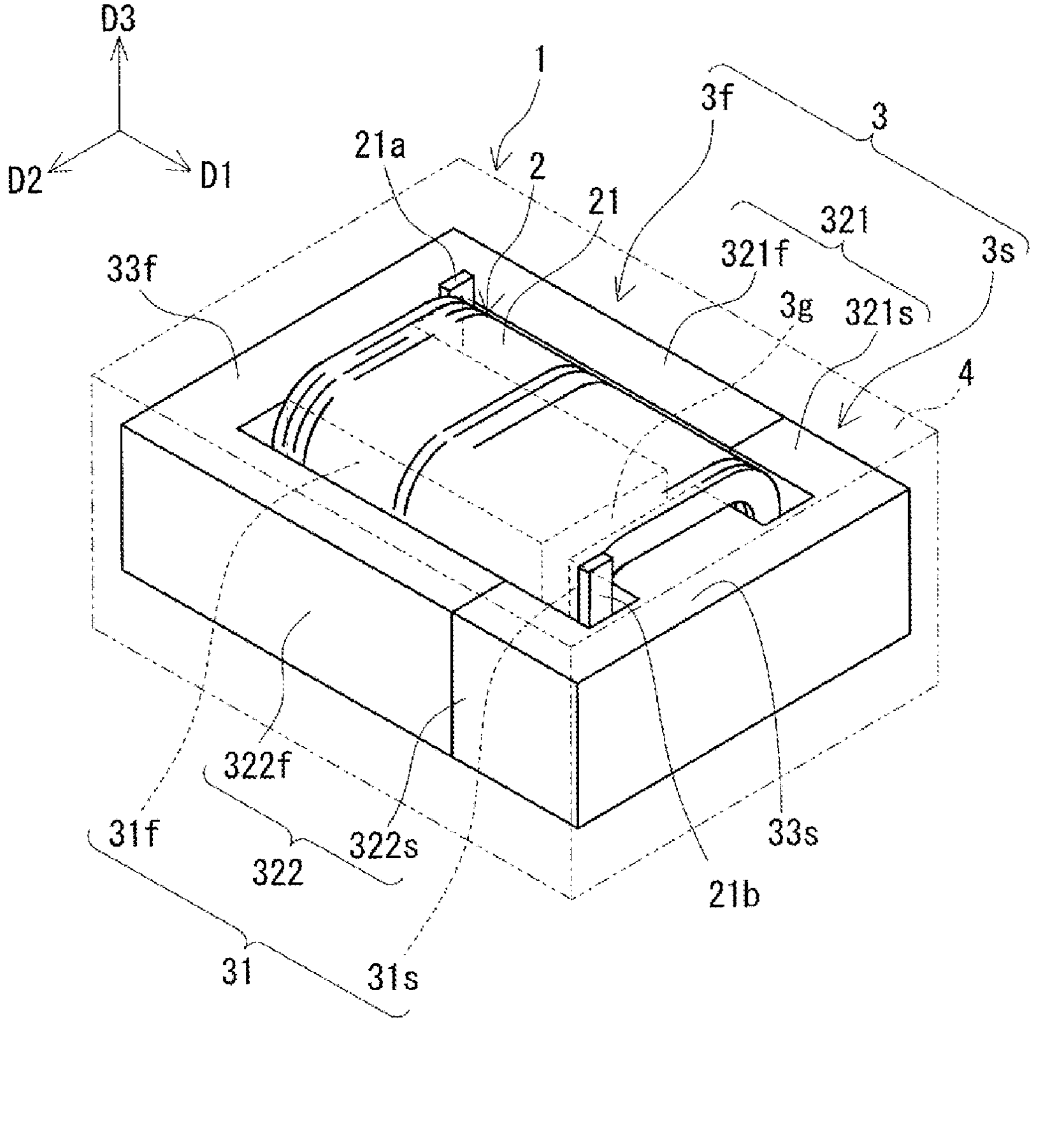
FIG. 1 is a perspective view showing an overview of a reactor according to a first embodiment.

A composite material molded body is manufactured as follows. A raw material for the composite material molded body is poured into a mold. The raw material is a fluid material in which a soft magnetic powder is dispersed in an unsolidified resin. The raw material resin is then solidified.

In the manufacturing process, the solidification rate of the surface of the core piece in contact with the mold is faster than the solidification rate of the interior of the core piece. A void is formed inside the core piece if there is a large difference between the solidification rate at the fastest solidifying location and the solidification rate at the slowest solidifying location.

When a reactor is used, the reactor itself vibrates. Also, depending on the location where the reactor is installed, there are cases where the reactor vibrates due to the transmission of external vibration to the reactor. There is concern that a void may become a starting point of cracking caused by vibration.

One object of the present disclosure is to provide a core piece having fewer voids. Another object of the present disclosure is to provide a reactor in which a crack is less likely to be formed in a core piece due to vibration. Another object of the present disclosure is to provide a converter that includes such a reactor, and a power conversion device that includes such a converter.

[Advantageous Effects of Present Disclosure]

A core piece of the present disclosure has fewer voids.

In the reactor of the present disclosure, a crack is less likely to be formed in the core piece due to vibration.

The converter according to an aspect of the present disclosure and the power conversion device according to an aspect of the present disclosure have stable performance.

Description of Embodiments of Present Disclosure

First, embodiments of the present disclosure will be listed and described.

(1) A core piece according to an aspect of the present disclosure is a core piece constituted by a molded body of a composite material in which a soft magnetic powder is dispersed in a resin, the core piece including: a middle core portion configured to be arranged inside a coil; and an end core portion configured to face an end face of the coil, wherein the middle core portion includes a hole portion or a groove portion extending in an axial direction of the coil, and in a lateral cross-section of the middle core portion, a radius of a first inscribed circle is less than or equal to 0.6 times a radius of a reference inscribed circle, the lateral cross-section being a cross-section of the middle core portion passing through the hole portion or the groove portion along a plane orthogonal to the axial direction of the coil, the first inscribed circle being a largest inscribed circle between an outline of the hole portion or the groove portion in the lateral cross-section and a peripheral outline of the middle core portion in the lateral cross-section, the reference inscribed circle being a largest inscribed circle in a first virtual outline, and the first virtual outline being a smallest quadrilateral circumscribing the lateral cross-section.

In general, in a core piece constituted by a composite material molded body, the difference between the solidification rate at the fastest solidifying location and the solidification rate at the slowest solidifying location in the manufacturing process is likely to be higher in the middle core portion of the core piece than in other portions of the core piece. If the difference between the solidification rates is high, a void is likely to be formed as described above. In other words, a void is likely to be formed in the middle core portion.

In the middle core portion of the core piece, the radius of the first inscribed circle is less than or equal to 0.6 times the radius of the reference inscribed circle, and therefore the difference between the solidification rates is low, and a void is less likely to be formed. The core piece therefore has few voids, thus making it easier to construct a reactor in which a crack is less likely to be formed in the middle core portion due to vibration.

(2) In the core piece according to an aspect, an inner area of the hole portion or the groove portion in the lateral cross-section may be less than or equal to 10% of an area of a second virtual outline, the second virtual outline being a smallest shape enclosing the lateral cross-section.

The difference between the solidification rates in the middle core portion of the core piece is small, thus making it easier to suppress a decrease in the magnetic path area of the middle core portion and an increase in the size of the middle core portion.

(3) In the core piece according to an aspect, the hole portion or the groove portion may overlap a center of gravity of the first virtual outline.

If there are no hole portions and no groove portions, the solidification rate is likely to be slowest at the center of gravity of the first virtual outline. Due to the hole portion or the groove portion being provided in the core piece so as to overlap the center of gravity of the first virtual outline, the solidification rate at the slowest solidifying location is faster than the solidification rate at the slowest solidifying location in the case where no hole portion or groove portion is provided. For this reason, it is easier to reduce the difference between the solidification rates in the middle core portion of the core piece.

(4) In the core piece according to an aspect, the middle core portion may include the hole portion, and an outline shape of the hole portion may be a circular shape or a polygonal shape.

A void is less likely to be formed in the core piece having the hole portion with the outline shape described above. Moreover, the core piece having the hole portion with the outline shape described above can be molded more easily.

(5) In the core piece according to an aspect, the middle core portion may include the groove portion, and the lateral cross-section may be H-shaped or U-shaped or constituted by two parallel I-shaped portions.

A void is less likely to be formed in the core piece whose lateral cross-section is shaped as described above. Moreover, the core piece whose lateral cross-section is shaped as described above can be molded more easily.

(6) In the core piece according to an aspect, the hole portion or the groove portion may extend continuously from an end face of the middle core portion to an outward face of the end core portion.

The above-described core piece is suitable for a reactor that includes a later-described molded resin portion. The reason for this is that the hole portion can be used as a channel for the supply of the raw material for the molded resin portion during the formation process for the molded resin portion.

(7) In the core piece according to an aspect, the hole portion or the groove portion may extend continuously from an end face of the middle core portion to an intermediate position in the end core portion, or extends continuously from an outward face of the end core portion to an intermediate position in the middle core portion, and in a vertical cross-section of the core piece, a radius of a second inscribed circle may be less than or equal to 0.6 times the radius of the reference inscribed circle, the vertical cross-section being a cross-section of the core piece passing through the hole portion or the groove portion along a plane orthogonal to a side view direction of the core piece, and the second inscribed circle being a largest inscribed circle in contact with the end face of the middle core portion and either a bottom portion of the hole portion or an end portion of the groove portion in the vertical cross-section, or a largest inscribed circle in contact with the outward face of the end core portion and either the bottom portion of the hole portion or the end portion of the groove portion in the vertical cross-section.

In the above-described core piece, the radius of the second inscribed circle is less than or equal to 0.6 times the radius of the reference inscribed circle, and therefore a void is less likely to be formed, and a crack is less likely to be formed due to vibration.

(8) In the core piece according to an aspect, the hole portion or the groove portion may extend continuously from an end face of the middle core portion to an intermediate position in the end core portion, or extends continuously from an outward face of the end core portion to an intermediate position in the middle core portion, and in a horizontal cross-section of the core piece, a radius of a third inscribed circle may be less than or equal to 0.6 times the radius of the reference inscribed circle, the horizontal cross-section being a cross-section of the core piece passing through the hole portion or the groove portion along a plane orthogonal to a plan view direction of the core piece, and the third inscribed circle being a largest inscribed circle in contact with the end face of the middle core portion and either a bottom portion of the hole portion or an end portion of the groove portion in the horizontal cross-section, or a largest inscribed circle in contact with the outward face of the end core portion and either the bottom portion of the hole portion or the end portion of the groove portion in the horizontal cross-section.

In the core piece, the radius of the third inscribed circle is less than or equal to 0.6 times the radius of the reference inscribed circle, and therefore a void is less likely to be formed, and a crack is less likely to be formed due to vibration.

(9) A reactor according to an aspect of the present disclosure includes: a coil; and a magnetic core, wherein the coil includes one winding portion, the magnetic core is a compound body that is a combination of a first core piece and a second core piece, and at least either the first core piece or the second core piece is the core piece according to any one of aspects (1) to (8).

Due to the reactor including the above-described core piece, a crack is less likely to be formed in the core piece due to vibration.

(10) A converter according to an aspect of the present disclosure includes the reactor according to aspect (9).

Due to including the above-described reactor, the converter has stable performance.

(11) A power conversion device according to an aspect of the present disclosure includes the converter according to aspect (10).

Due to including the above-described converter, the power conversion device has stable performance.

Details of Embodiments of Present Disclosure

Details of embodiments of the present disclosure will be described below with reference to the drawings. Like reference numerals in the drawings indicate elements having like names.

First Embodiment

[Reactor]

Figure 2:
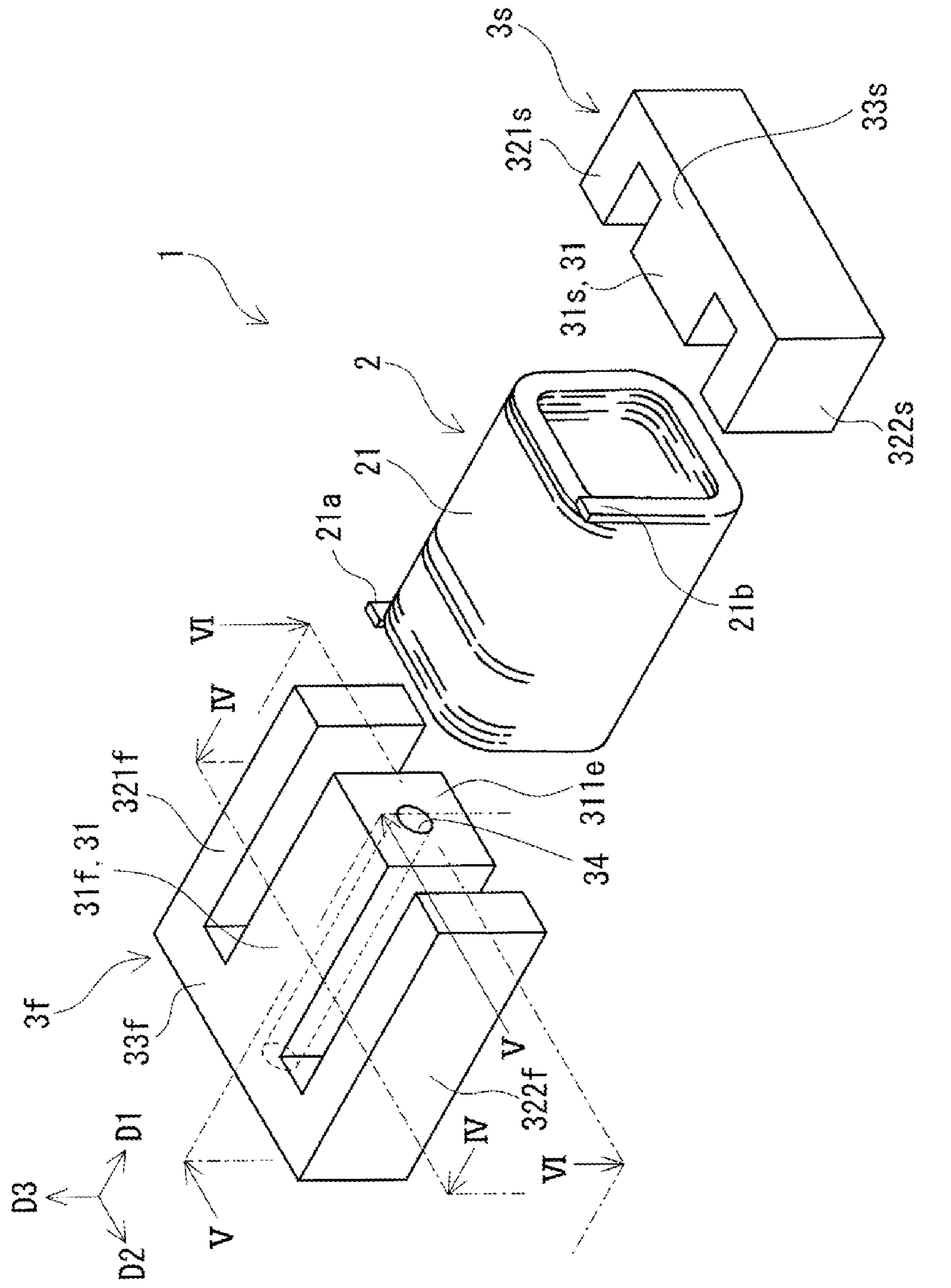
FIG. 2 is a perspective view showing an overview of an exploded state of the reactor according to the first embodiment.
Figure 3:
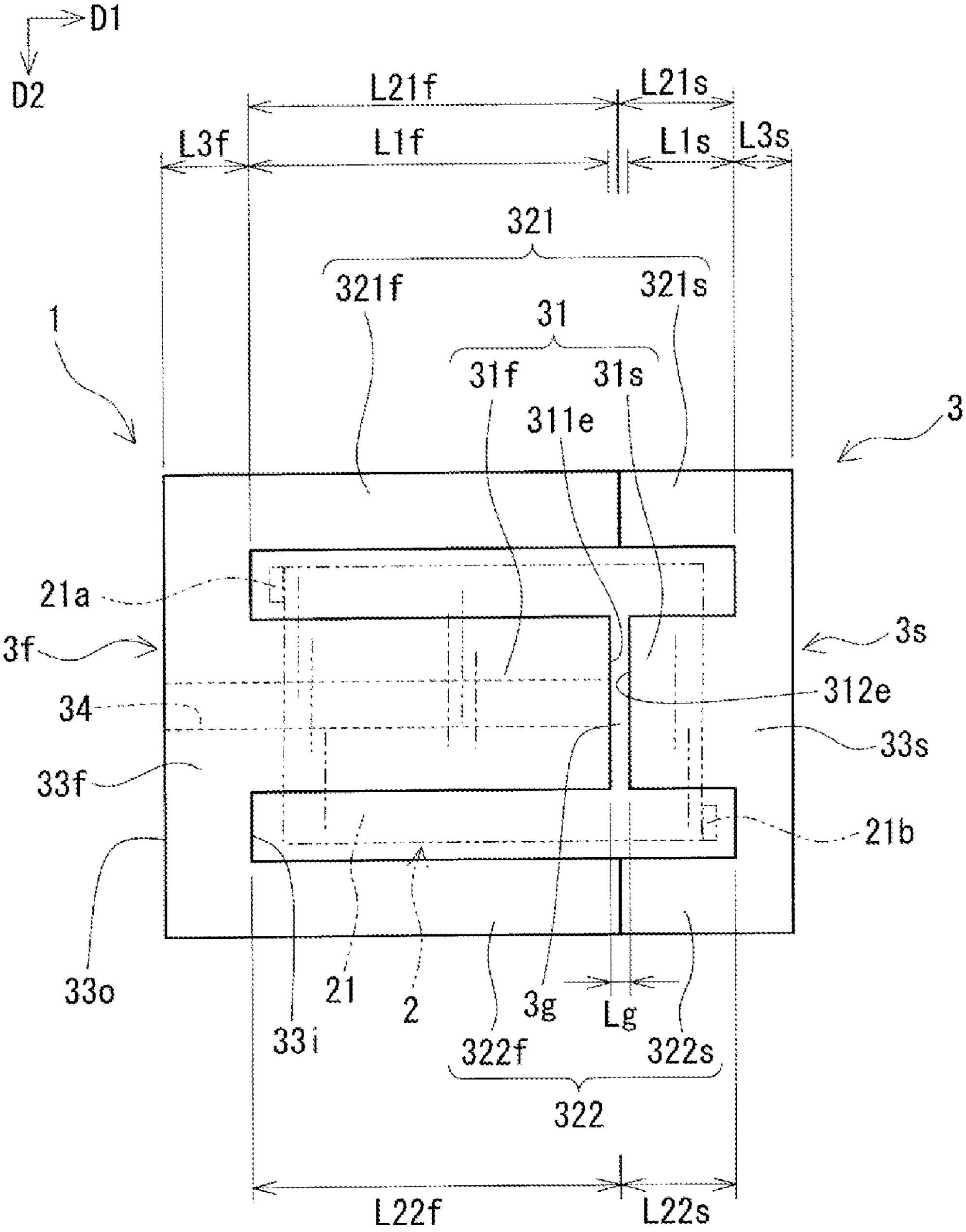
FIG. 3 is a top view showing an overview of the reactor according to the first embodiment.

A reactor 1 of the first embodiment will be described below with reference to FIGS. 1 to 8. As shown in FIG. 1, the reactor 1 includes a coil 2 and a magnetic core 3. The coil 2 has one winding portion 21. The magnetic core 3 is a compound body that is a combination of a first core piece 3*f* and a second core piece 3*s*. One feature of the reactor 1 of the present embodiment is that at least either the first core piece 3*f* or the second core piece 3*s* has a specific hole portion 34 as shown in FIG. 2. Configurations will be described in detail below. In FIG. 3, the coil 2 is shown with a dashed double-dotted line for convenience in the description.

[Coil]

The coil 2 includes one hollow winding portion 21, as shown in FIGS. 1 and 2. Compared with a reactor in which two winding portions are arranged side by side in a direction orthogonal to the axial direction of the winding portions, the reactor 1 including one winding portion 21 can have a shorter length along a later-described second direction D2 while the winding portion 21 has the same cross-sectional area and the same number of turns.

The winding portion 21 may have a polygonal tubular shape or a circular tubular shape. A rectangular tubular shape may also be a square tubular shape. The winding portion 21 of the present embodiment has a square tubular shape, as shown in FIG. 2. In other words, the end faces of the winding portion 21 have a square frame shape. Due to the winding portion 21 having a rectangular tubular shape, the area of contact between the winding portion 21 and the installation target can be increased more easily than in the case where the winding portion 21 has a circular tubular shape with the same cross-sectional area. For this reason, the reactor 1 can easily dissipate heat to the installation target via the winding portion 21. Moreover, the winding portion 21 can be easily installed stably on the installation target. The corners of the winding portion 21 are rounded.

The winding portion 21 is configured by winding a single coil wire into a spiral without a joint. A known coil wire can be used for the coil wire. A covered flat wire is used as the coil wire of the present embodiment. The conductor wire of the covered flat wire is constituted by a copper flat wire. The insulating coating of the covered flat wire is made of enamel. The winding portion 21 is constituted by an edgewise coil obtained by winding the covered flat wire edgewise.

In the present embodiment, a first end portion 21*a* and a second end portion 21*b* of the winding portion 21 are drawn circumferentially outward from the winding portion 21 at one end and the other end, respectively, in the axial direction of the winding portion 21. Although not shown, the insulating coating is stripped from the first end portion 21*a* and the second end portion 21*b* of the winding portion 21 to expose the conductor wire. In the present embodiment, the exposed portions of the conductor wire are drawn out of a later-described molded resin portion 4 and are connected to terminal members. The terminal members are not shown. An external device is connected to the coil 2 via the terminal members. The external device is not shown. The external device is a power source that supplies electrical power to the coil 2, for example.

[Magnetic Core]

As shown in FIG. 1, the magnetic core 3 includes a middle core portion 31, a first side core portion 321, a second side core portion 322, a first end core portion 33*f*, and a second end core portion 33*s*. In the magnetic core 3, the direction along the axial direction of the winding portion 21 is a first direction D1, the direction in which the middle core portion 31, the first side core portion 321, and the second side core portion 322 are side by side is a second direction D2, and the direction orthogonal to the first direction D1 and the second direction D2 is a third direction D3.

(Middle Core Portion)

The middle core portion 31 has a portion located inside the winding portion 21. The middle core portion 31 has a shape corresponding to the inner peripheral shape of the winding portion 21, for example. In the present embodiment, the middle core portion 31 is shaped as a quadrangular prism as shown in FIG. 2. The corners of the middle core portion 31 may be rounded along the inner peripheral surface of the corners of the winding portion 21.

The length of the middle core portion 31 along the first direction D1 is substantially equivalent to the length of the winding portion 21 along the axial direction, as shown in FIG. 3. The length of the middle core portion 31 along the first direction D1 is a sum length L1*f*+L1*s*, that is to say the sum of a length L1*f* of the first middle core portion 31*f* along the first direction D1 and a length L1*s* of the second middle core portion 31*s* along the first direction D1, which will be described later. The length of the middle core portion 31 along the first direction D1 does not include a length Lg of a later-described gap portion 3*g* along the first direction D1. This similarly applies to the lengths of the other core portions.

In the present embodiment, the length of the middle core portion 31 along the first direction D1 is shorter than the length of the first side core portion 321 along the first direction D1 and the length of the second side core portion 322 along the first direction D1. The length of the first side core portion 321 along the first direction D1 is a sum length L21*f*+L21*s*, that is to say the sum of a length L21*f* of a first side core portion 321*f* along the first direction D1 and a length L21*s* of a first side core portion 321*s* along the first direction D1, which will be described later. The length of the second side core portion 322 along the first direction D1 is a sum length L22*f*+L22*s*, that is to say the sum of a length L22*f* of the second side core portion 322*f* along the first direction D1 and a length L22*s* of the second side core portion 322*s* along the first direction D1, which will be described later.

As an alternative to the present embodiment, the length of the middle core portion 31 along the first direction D1 may be equivalent to the length of the first side core portion 321 along the first direction D1 and the length of the second side core portion 322 along the first direction D1.

There are cases where the middle core portion 31 is constituted by two core portions, namely the first middle core portion 31*f* and the second middle core portion 31*s*, as in the case where the combination of the first core piece 3*f* and the second core piece 3*s* is of the E-E type as in the present embodiment, or of the E-T type or the F-F type, which will be described later, for example. Although not shown, the middle core portion 31 may be constituted by one core portion, namely the first middle core portion 31*f*, as in the case where the aforementioned combination is of the E-I type, the E-U type, the T-U type, or the F-L type, for example.

(First Side Core Portion and Second Side Core Portion)

As shown in FIG. 1, the first side core portion 321 and the second side core portion 322 are arranged facing each other while sandwiching the middle core portion 31 therebetween. The first side core portion 321 and the second side core portion 322 are arranged on the outer periphery of the winding portion 21. The first side core portion 321 and the second side core portion 322 have the same shape, which is a thin prismatic shape in the present embodiment.

The length of the first side core portion 321 (L21*f*+L21*s*) and the length of the second side core portion 322 (L22*f*+L22*s*) are longer than the length of the winding portion 21 along the axial direction, as shown in FIG. 3. Note that the length of the first side core portion 321 along the first direction D1 and the length of the second side core portion 322 along the first direction D1 may be equivalent to the length of the winding portion 21 along the axial direction.

There are cases where the first side core portion 321 is constituted by two core portions, namely the first side core portion 321*f* and the first side core portion 321*s*, as in the case where the combination of the first core piece 3*f* and the second core piece 3*s* is of the E-E type as in the present embodiment, or of the E-U type, which will be described later, for example. Although not shown, the first side core portion 321 may be constituted by one core portion, namely the first side core portion 321*f*, as in the case where the aforementioned combination is of the E-T type, the E-I type, the T-U type, the F-F type, or the F-L type, for example. There are cases where the second side core portion 322 is constituted by two core portions, namely the second side core portion 322*f* and the second side core portion 322*s*, as in the case where the aforementioned combination is of the E-E type or the E-U type, for example. Although not shown, the second side core portion 322 may be constituted by one core portion, namely the second side core portion 322*f*, as in the case where the aforementioned combination is of the E-T type, the E-I type, the T-U type, the F-F type, or the F-L type, for example.

In the present embodiment, the sum of the cross-sectional area of the first side core portion 321 and the cross-sectional area of the second side core portion 322 is the same as the cross-sectional area of the middle core portion 31. In the present embodiment, the middle core portion 31, the first side core portion 321, and the second side core portion 322 have the same length along the third direction D3. In other words, the sum of the length of the first side core portion 321 along the second direction D2 and the length of the second side core portion 322 along the second direction D2 corresponds to the length of the middle core portion 31 along the second direction D2. The length of the first side core portion 321 along the second direction D2 and the length of the second side core portion 322 along the second direction D2 are 0.5 times the length of the middle core portion 31 along the second direction D2. The lengths of the first side core portion 321 and the second side core portion 322 along the third direction D3 are greater than or equal to the length of the middle core portion 31 along the second direction D2.

(First End Core Portion and Second End Core Portion)

The first end core portion 33*f* faces a first end face of the winding portion 21. The second end core portion 33*s* faces a second end face of the winding portion 21. Here, "faces" means that an inward face 33*i* of the first end core portion 33*f* and the first end face of the winding portion 21 face each other. This also means that the inward face of the second end core portion 33*s* and the second end face of the winding portion 21 face each other. In the present embodiment, the shape of the first end core portion 33*f* and the shape of the second end core portion 33*s* are thin prismatic shapes, as shown in FIGS. 1 and 2.

The length of the first end core portion 33*f* along the second direction D2 is longer than the length of the winding portion 21 along the second direction D2. In the present embodiment, the length of the first end core portion 33*f* along the third direction D3 is shorter than the length of the winding portion 21 along the third direction D3, as shown in FIG. 1. As an alternative to the present embodiment, the length of the first end core portion 33*f* along the third direction D3 may be longer than or the same as the length of the winding portion 21 along the third direction D3. The lengths of the second end core portion 33*s* along the second direction D2 and the third direction D3 are the same as those of the first end core portion 33*f*.

(First Core Piece and Second Core Piece)

Various combinations of the first core piece 3*f* and the second core piece 3*s* can be obtained by appropriately selecting the shapes of the first core piece 3*f* and the second core piece 3*s*. The shape of the first core piece 3*f* and the shape of the second core piece 3*s* may be asymmetrical as in the present embodiment, or, unlike the present embodiment, may be symmetrical. Here, "asymmetrical" means having different shapes. Also, "symmetrical" means having the same shape and size.

The first core piece 3*f* and the second core piece 3*s* are divided in the first direction D1 as shown in FIG. 3. In the present embodiment, the combination of the first core piece 3*f* and the second core piece 3*s* is of the E-E type. As an alternative to the present embodiment, the combination of the first core piece 3*f* and the second core piece 3*s* may be of the E-I type, the E-T type, the E-U type, the T-U type, the F-F type, or the F-L type, although such types are not shown. Since the reactor 1 can be constructed by the first core piece 3*f* and the second core piece 3*s* being combined with the winding portion 21 along the axial direction of the winding portion 21, the ease of work in manufacturing is excellent.

A gap portion 3*g*, which will be described later, may be provided between the first core piece 3*f* and the second core piece 3*s*, or the gap portion 3*g* may not be provided.

The E-shaped first core piece 3*f* of the present embodiment includes the first middle core portion 31*f*, the first side core portion 321*f*, the second side core portion 322*f*, and the first end core portion 33*f*. The first middle core portion 31*f* constitutes a portion of the middle core portion 31. The first side core portion 321*f* constitutes a portion of the first side core portion 321. The second side core portion 322*f* constitutes a portion of the second side core portion 322. The first core piece 3*f* is a molded body in which the first middle core portion 31*f*, the first side core portion 321*f*, the second side core portion 322*f*, and the first end core portion 33*f* are integrated with each other.

The first end core portion 33*f* has an inward face 33*i* and an outward face 33*o*. The inward face 33*i* is the face that faces the first end face of the winding portion 21 as described above. The outward face 33*o* is the face provided on the side opposite to the inward face 33*i* in the first direction D1. The outer peripheral faces of the first middle core portion 31*f*, the first side core portion 321*f*, and the second side core portion 322*f* are connected to the inward face 33*i*. The first side core portion 321*f* and the second side core portion 322*f* are provided at respective ends of the first end core portion 33*f* in the second direction D2. The first middle core portion 31*f* is provided at the center of the first end core portion 33*f* in the second direction D2.

As described above, the second core piece 3*s* of the present embodiment, which is E-shaped and asymmetric with the first core piece 3*f*, includes the second middle core portion 31*s*, the first side core portion 321*s*, the second side core portion 322*s*, and the second end core portion 33*s*. The second middle core portion 31*s* constitutes the remaining portion of the middle core portion 31. The first side core portion 321*s* constitutes the remaining portion of the first side core portion 321. The second side core portion 322*s* constitutes the remaining portion of the second side core portion 322. The second core piece 3*s* is a molded body in which the second middle core portion 31*s*, the first side core portion 321*s*, the second side core portion 322*s*, and the second end core portion 33*s* are integrated with each other. The positions and connections of the core portions in the second core piece 3*s* are the same as the positions and connections of the core portions in the first core piece 3*f* described above.

The first core piece 3*f* and the second core piece 3*s* are combined such that the end face of the first side core portion 321*f* and the end face of the first side core portion 321*s* are in contact with each other, and furthermore the end face of the second side core portion 322*f* and the end face of the second side core portion 322*s* are in contact with each other. A gap is provided between an end face 311*e* of the first middle core portion 31*f* and an end face 312*e* of the second middle core portion 31*s*. The length of this gap along the first direction D1 corresponds to a length Lg of the gap portion 3*g* along the first direction D1.

As an alternative to the present embodiment, the first core piece 3*f* and the second core piece 3*s* may be combined such that a gap is provided between the end face of the first side core portion 321*f* and the end face of the first side core portion 321*s*, and furthermore a gap is provided between the end face of the second side core portion 322*f* and the end face of the second side core portion 322*s*. If the length of the middle core portion 31 along the first direction D1 is shorter than the length of the first side core portion 321 along the first direction D1, a gap is also provided between the end face 311*e* of the first middle core portion 31*f* and the end face 312*e* of the second middle core portion 31*s*. In this case, the distance between the end face 311*e* and the end face 312*e* is larger than the distance between the end face of the first side core portion 321*f* and the end face of the first side core portion 321*s*, and also the distance between the end face of the second side core portion 322*f* and the end face of the second side core portion 322*s*. It is preferable that the first core piece 3*f* and the second core piece 3*s* are combined with each other using the molded resin portion 4, which will be described later.

<Hole Portion>

Out of the first core piece 3*f* and the second core piece 3*s*, the core piece that is constituted by a composite material molded body has a hole portion 34 as shown in FIGS. 4 to 8. As will be described later, in the present embodiment, the first core piece 3*f* is entirely constituted by a composite material molded body. The second core piece 3*s* is entirely constituted by a powder compact. In other words, in the present embodiment, the first core piece 3*f* has the hole portion 34 and the second core piece 3*s* does not have the hole portion 34.

Figure 4:
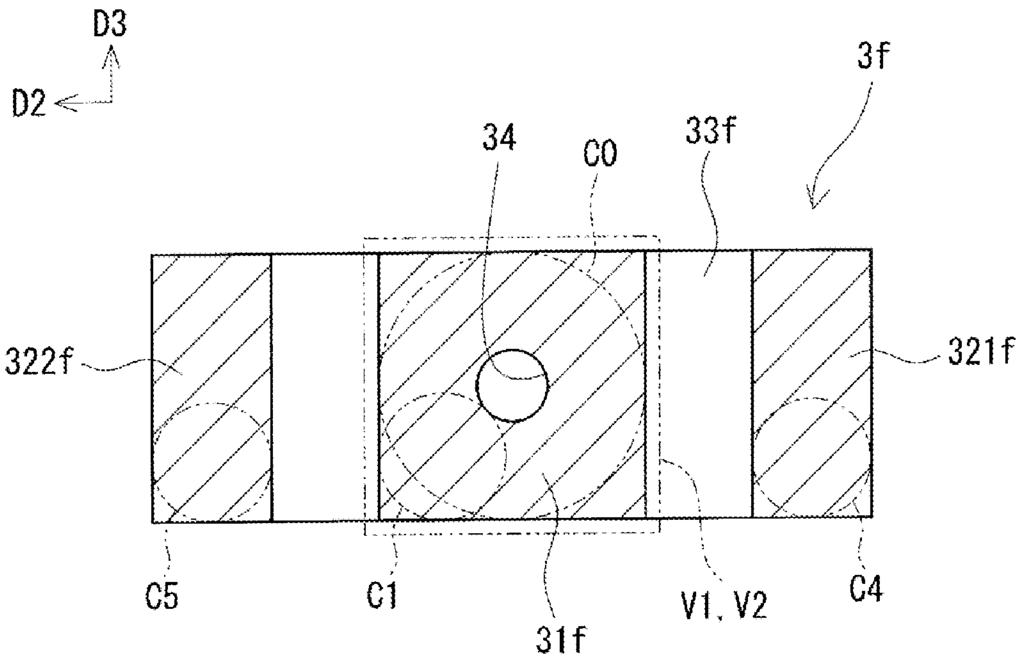
FIG. 4 is a cross-sectional view taken view along IV-IV in FIG. 2.
Figure 7:
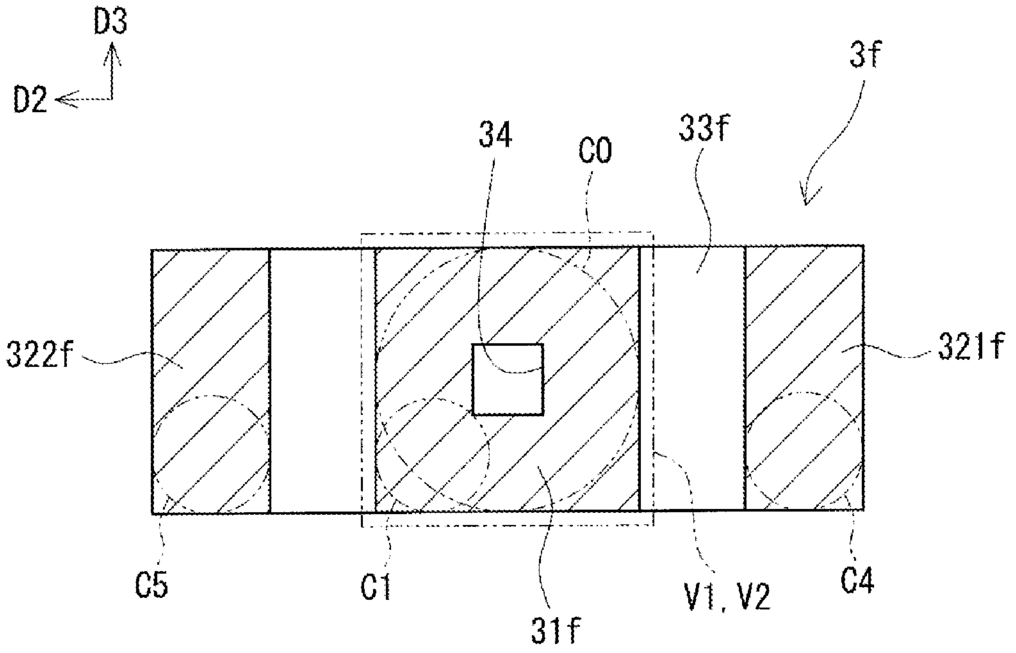
FIG. 7 is a lateral cross-sectional view of another example of a first core piece provided in the reactor according to the first embodiment.
Figure 8:
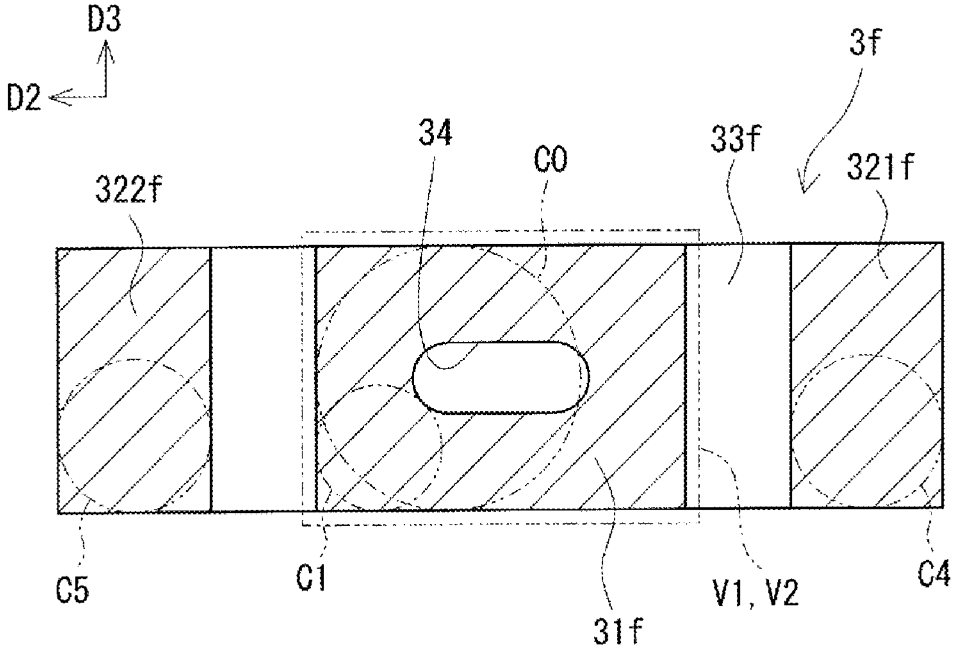
FIG. 8 is a lateral cross-sectional view of another example of the first core piece provided in the reactor according to the first embodiment.

As shown in FIGS. 4, 7, and 8, the hole portion 34 does not have an opening connected to the outer peripheral face of the first middle core portion 31*f* in the lateral cross-section of the first middle core portion 31*f*. FIG. 4 shows a lateral cross-section of the first core piece 3*f* passing through the hole portion 34 along a plane orthogonal to the first direction DE FIGS. 7 and 8 show cross-sections of the first core piece 3*f* taken at the same position as the lateral cross-section shown in FIG. 4.

The outline shape, size, and location of the hole portion 34 in the lateral cross-section of the first middle core portion 31*f* can be selected as appropriate such that a radius r1 of a first inscribed circle C1 is less than or equal to 0.6 times a radius r0 of a reference inscribed circle C0. The first inscribed circle C1 of the present embodiment is the largest inscribed circle between the peripheral outline of the first middle core portion 31*f* and the outline of the hole portion 34 in the lateral cross-section of the first middle core portion 31*f*. The reference inscribed circle C0 is the largest inscribed circle in a first virtual outline V1. The first virtual outline V1 is the smallest quadrilateral that circumscribes the lateral cross-section of the first middle core portion 31*f*. Although the first virtual outline V1 in FIGS. 4, 7, and 8 is shown by a dashed double-dotted line that is larger than the outline in order to distinguish it from the outline of the lateral cross-section of the first middle core portion 31*f*, it actually overlaps the outline of the lateral cross-section. This similarly applies to a second virtual outline V2 described later with reference to FIGS. 4, 7, and 8.

In the first middle core portion 31*f* in which the radius r1 is less than or equal to 0.6 times the radius r0, a void is less likely to be formed during the manufacturing process for the first core piece 3*f*. This is because in the first middle core portion 31*f* in which the radius r1 satisfies less than or equal to 0.6 times the radius r0, the difference between the solidification rate at the fastest solidifying location and the solidification rate at the slowest solidifying location in the manufacturing process is small. For this reason, a crack is less likely to be formed in the first middle core portion 31*f* due to vibration. The radius r1 may also be less than or equal to 0.55 times the radius r0, and particularly less than or equal to 0.5 times the radius r0. The radius r1 may be greater than or equal to 0.44 times the radius r0, for example. When the radius r1 is greater than or equal to 0.44 times the radius r0, the magnetic path area of the first middle core portion 31*f* is not excessively small, thus making it easier to suppress deterioration of a magnetic characteristic of the first core piece 3*f*. Thus, the radius r1 may be 0.44 to 0.6 times the radius r0 inclusive, more preferably 0.44 to 0.55 times the radius r0 inclusive, and particularly 0.44 to 0.5 times the radius r0 inclusive.

The outline shape of the hole portion 34 in the lateral cross-section of the first middle core portion 31*f* is circular or polygonal, for example. A circular shape includes the perfect circle shown in FIG. 4, an ellipse (not shown), or the racetrack shape shown in FIG. 8, for example. The outline of the racetrack shape is constituted by a first straight line, a second straight line, a first arc line, and a second arc line. The first straight line and the second straight line are parallel to each other and have the same length. In FIG. 8, the first straight line is located closer to the upper side of the paper surface, and the second straight line is located closer to the lower side of the paper surface. The first arc line connects a first end of the first straight line and a first end of the second straight line. A second arc line connects a second end of the first straight line and a second end of the second straight line. For example, in FIG. 8, the first arc line and the first end are located closer to the left side of the paper surface, and the second arc line and the second end are located closer to the right side of the paper surface. Examples of polygonal shapes include a square and a hexagon. A quadrilateral shape includes the square shape shown in FIG. 7 and a rectangular shape (not shown). The polygonal shape may be a shape with rounded corners.

The size of the hole portion 34 in the lateral cross-section of the first middle core portion 31*f*, that is to say an inner area S1 of the hole portion 34, may be less than or equal to 10% of an area S2 of the second virtual outline V2. The inner region of the hole portion 34 is the region surrounded by the outline of the hole portion 34. The second virtual outline V2 is the smallest shape that encloses the lateral cross-section of the first middle core portion 31*f*. In the present embodiment, the lateral cross-section of the first middle core portion 31*f* has a rectangular shape, and therefore the second virtual outline V2 has the same shape and size as the first virtual outline V1. If the lateral cross-section of the first middle core portion 31*f* has a circular shape unlike the present embodiment, for example, the second virtual outline V2 is circular and has a different shape and size from the first virtual outline V1.

According to the first core piece 3*f* whose area S1 is less than or equal to 10% of the area S2, it is possible to suppress the formation of a void in the first middle core portion 31*f* during the manufacturing process for the first core piece 3*f*. Also, according to the first core piece 3*f*, it is possible to more easily suppress a decrease in the magnetic path area of the first middle core portion 31*f* and an increase in the size of the first middle core portion 31*f*. The area S1 may also be less than or equal to 7% of the area S2, and particularly less than or equal to 5% of the area S2. The area S1 may be greater than or equal to 1% of the area S2. In the first core piece 3*f* whose area S1 is greater than or equal to 1% of the area S2, a void is less likely to be formed in the first core piece 3*f* during the manufacturing process for the first core piece 3*f*. Thus, the area S1 may be 1% to 10% of the area S2 inclusive, furthermore 1% to 7% of the area S2 inclusive, and particularly 2% to 5% of the area S2 inclusive.

The position at which the hole portion 34 is formed in the lateral cross-section of the first middle core portion 31*f* may be a position overlapping the center of gravity of the first virtual outline V1. The center of gravity of the first virtual outline V1 is the intersection of the diagonal lines of the first virtual outline V1. The state in which the hole portion 34 overlaps the center of gravity of the first virtual outline V1 refers to a state in which the outline of the hole portion 34 encloses the center of gravity of the first virtual outline V1. If the hole portion 34 is not provided, the solidification rate is likely to be the slowest at the location of the center of gravity of the first virtual outline V1. Due to the hole portion 34 being provided so as to overlap the center of gravity of the first virtual outline V1, the solidification rate at the slowest solidifying location in the case of having the hole portion 34 is faster than the solidification rate at the slowest solidifying location in the case of not having the hole portion 34. For this reason, the difference between the solidification rate at the fastest solidifying location and the solidification rate at the slowest solidifying location in the first middle core portion 31*f* is likely to be small. Also, due to the hole portion 34 being provided so as to overlap the center of gravity of the first virtual outline V1, the distance between the outer peripheral surface of the first middle core portion 31*f* and the outline of the hole portion 34 is likely to be uniform along the circumferential direction of the hole portion 34. In particular, the hole portion 34 may be provided such that the center of gravity of the region surrounded by the outline of the hole portion 34 coincides with the center of gravity of the first virtual outline V1.

In FIG. 4, the outline shape of the hole portion 34 is a perfect circle, and therefore the center of gravity of the region surrounded by the outline of the hole portion 34 is the center of the perfect circle. In FIG. 7, the outline shape of the hole portion 34 is a square, and therefore the center of gravity of the region surrounded by the outline of the hole portion 34 is the intersection of the diagonal lines of the square. In FIG. 8, the outline shape of the hole portion 34 is a racetrack shape, and therefore the center of gravity of the region surrounded by the outline of the hole portion 34 is the intersection of a first diagonal line and a second diagonal line. The first diagonal line is the straight line that connects the first end of the first straight line and the second end of the second straight line. The second diagonal line is the straight line that connects the second end of the first straight line and the first end of the second straight line.

Figure 5:
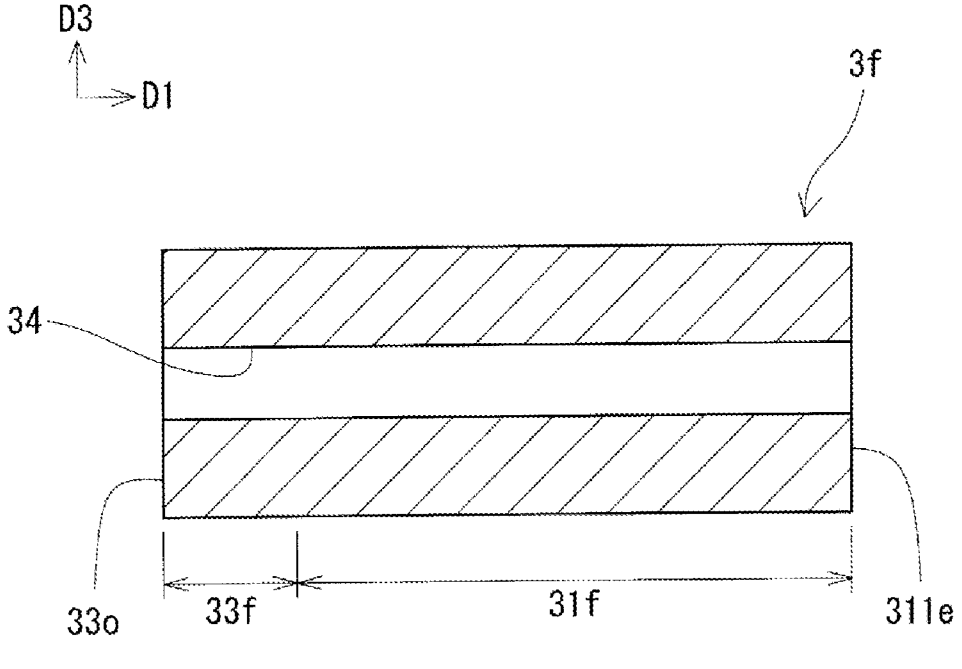
FIG. 5 is a cross-sectional view taken view along V-V in FIG. 2.
Figure 6:
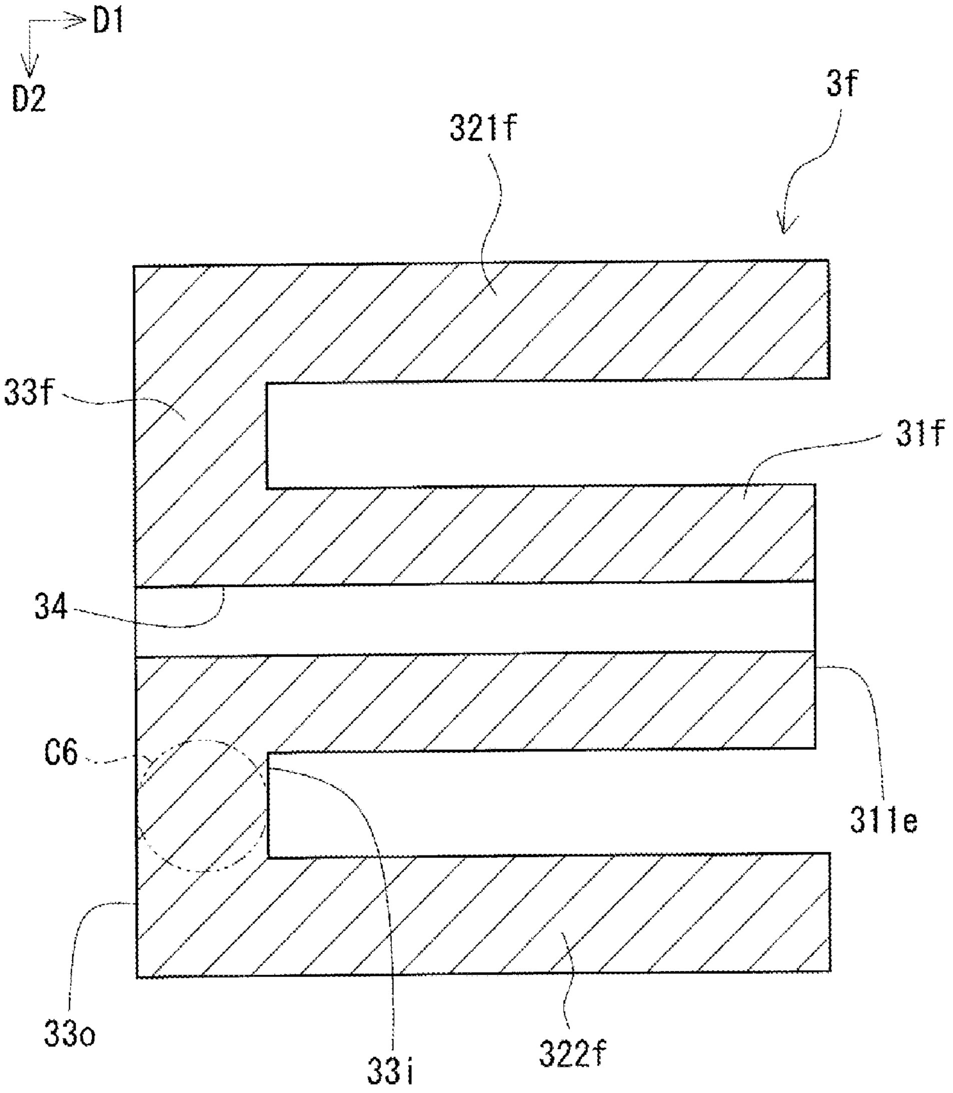
FIG. 6 is a cross-sectional view taken along line VI-VI in FIG. 2.

As shown in FIG. 2, the hole portion 34 is elongated in the first direction D1 in the first middle core portion 31*f*. In the present embodiment, the hole portion 34 is a through hole as shown in FIGS. 5 and 6. FIG. 5 shows a vertical cross-section of the first core piece 3*f* passing through the hole portion 34 along a plane orthogonal to a side view direction of the first core piece 3*f*. The side view direction is the second direction D2. FIG. 5 shows a cut state of the first middle core portion 31*f* in which the outline shape of the hole portion 34 is the perfect circle shown in FIG. 4. FIG. 6 shows a horizontal cross-section of the first core piece 3*f* passing through the hole portion 34 along a plane orthogonal to the plan view direction of the first core piece 3*f*. The plan view direction is the third direction D3. FIG. 6 shows a cut state of the first middle core portion 31*f* in which the outline shape of the hole portion 34 is the perfect circle shown in FIG. 4.

The hole portion 34, which is a through hole, is continuous from the end face 311*e* of the first middle core portion 31*f* to the outward face 33*o* of the first end core portion 33*f*. In other words, the openings of the hole portion 34 are respectively connected to the end face 311*e* and the outward face 33*o*. In the case where the reactor 1 includes the later-described molded resin portion 4, the hole portion 34 can be used as a channel for the supply of the raw material for the molded resin portion 4 from the outside of the first core piece 3*f* through the space between the end face 311*e* and the end face 312*e* during the formation process for the molded resin portion 4. Note that the hole portion 34 may be a blind hole as in a second embodiment described later with reference to FIGS. 9 and 10.

<Other Aspects>

In the case where the first core piece 3*f* has the first side core portion 321*f* and the second side core portion 322*f* as in the present embodiment, a radius r4 of a fourth inscribed circle C4 and a radius r5 of a fifth inscribed circle C5 are less than or equal to 0.6 times the radius r0 of the above-described reference inscribed circle C0. The fourth inscribed circle C4 is the largest inscribed circle within the peripheral outline of the lateral cross-section of the first side core portion 321*f*. The fifth inscribed circle C5 is the largest inscribed circle within the peripheral outline of the lateral cross-section of the second side core portion 322*f*. As described above, in the present embodiment, the lengths of the first side core portion 321*f* and the second side core portion 322*f* along the second direction D2 are 0.5 times the length of the first middle core portion 31*f* along the second direction D2. Also, the lengths of the first side core portion 321*f* and the second side core portion 322*f* along the third direction D3 are greater than or equal to the length of the first middle core portion 31*f* along the second direction D2. In other words, the radius r4 and the radius r5 are 0.5 times the radius r0. Also, as shown in FIG. 6, a radius r6 of a sixth inscribed circle C6 is less than or equal to 0.6 times the radius r0 of the above-described reference inscribed circle C0. The sixth inscribed circle C6 is the largest inscribed circle in the peripheral outline of the horizontal cross-section of the first end core portion 33*f*. A length L3*f* of the first end core portion 33*f* along the first direction D1 shown in FIG. 3 is 0.5 times the length of the first middle core portion 31*f* along the second direction D2. For this reason, the radius r6 is 0.5 times the radius r0.

(Materials)

At least either the first core piece 3*f* or the second core piece 3*s* is constituted by a composite material molded body. The first core piece 3*f* and the second core piece 3*s* may be constituted by different materials, or may be constituted by the same material. Being constituted by different materials includes not only the case in which the materials of the individual constituent elements of the core portions are different, but also the case in which the content ratios of constituent elements are different even though the individual constituent elements are constituted by the same material. For example, even in the case where the first core piece 3*f* and the second core piece 3*s* are constituted by a composite material molded body, if at least either the soft magnetic powder or the resin constituting the composite material include different materials, or if the materials constituting the soft magnetic powder and the resin are the same but the content ratios of the materials constituting the soft magnetic powder and the resin are different, the materials are considered to be different from each other. As described above, in the present embodiment, the first core piece 3*f* is constituted by a composite material molded body, and the second core piece 3*s* is constituted by a powder compact.

The composite material molded body is obtained by dispersing a soft magnetic powder in resin. The first core piece 3*f* constituted by a composite material molded body is manufactured as described below. A core corresponding to the hole portion 34 described above is placed inside a mold. The raw material for the composite material molded body is then poured into the mold. The raw material is a fluid material, which includes a soft magnetic powder dispersed in an unsolidified resin. The raw material resin is then solidified.

The soft magnetic particles constituting the soft magnetic powder are particles of a soft magnetic metal, coated particles that are particles of a soft magnetic metal coated with an insulating coating, or particles of a soft magnetic non-metal. Examples of soft magnetic metals include pure iron and an iron-based alloy. Examples of iron-based alloys include Fe—Si alloy and Fe—Ni alloy. The insulating coating is made of phosphate, for example. One example of a soft magnetic non-metal is ferrite.

The resin of the composite material is a thermosetting resin or a thermoplastic resin, for example. Examples of thermosetting resins include epoxy resins, phenol resins, silicone resins, and urethane resins. Examples of thermoplastic resins include polyphenylene sulfide resins, polyamide resins, liquid crystal polymers, polyimide resins, and fluorine resins. Examples of polyamide resins include nylon 6, nylon 66, and nylon 9T.

The composite material molded body may contain a ceramic filler. Examples of ceramic fillers include alumina and silica.

The content of the soft magnetic powder in the molded body of the composite material is 20% by volume or more and 80% by volume or less, for example. The content of the resin in the composite material molded body is 20% by volume or more and 80% by volume or less, for example. These content ratios are values when the composite material is 100% by volume, for example.

The powder compact is obtained by subjecting a soft magnetic powder to compression molding. Compared with a composite material, the powder compact can have a higher percentage of the soft magnetic powder in the core piece. For this reason, it is easy to improve a magnetic characteristic of the powder compact. Examples of magnetic characteristics include saturation magnetic flux density and relative magnetic permeability. Also, a powder compact includes a smaller amount of resin and a larger amount of soft magnetic powder than a molded body of composite material, and therefore has excellent heat dissipation. The magnetic powder content in the powder compact is 85% by volume or more and 99.99% by volume or less, for example. This content ratio is a value when the powder compact is 100% by volume.

The content of the soft magnetic powder in the powder compact or the composite material molded body is considered to be equivalent to the ratio of the area of the soft magnetic powder to the area of the lateral cross-section of the molded body. The content of the soft magnetic powder in the molded body is determined as follows. A cross-section of the molded body is observed with an SEM (Scanning Electron Microscope) to obtain an observation image. The magnification of the SEM is set from 200 to 500 times. Also, ten or more observation images are acquired. The total cross-sectional area is 0.1 $cm^2$ or more. One observation image may be acquired for each cross-section, or a plurality of observation images may be acquired for each cross-section. Image processing is performed on each acquired observation image to extract the outlines of particles. One example of the image processing is binarization processing. The area ratio of the soft magnetic particles is calculated for each observation image, and the average value of the area ratios is obtained. The average value is considered to be the content ratio of the soft magnetic powder.

(Size)

In the present embodiment, the sizes of the first core piece 3*f* and the second core piece 3*s* are different from each other. As an alternative to the present embodiment, the size of the first core piece 3*f* and the size of the second core piece 3*s* may be the same.

In the present embodiment, there is a portion in which the lengths of the core portions of the first core piece 3*f* along the first direction D1 are different from the lengths of the core portions of the second core piece 3*s* along the first direction D1. Specifically, the length L1*f* of the first middle core portion 31*f* is longer than the length L1*s* of the second middle core portion 31*s*. The length L21*f* of the first side core portion 321*f* is longer than the length L21*s* of the first side core portion 321*s*. The length L22*f* of the second side core portion 322*f* is longer than the length L22*s* of the second side core portion 322*s*. The length L3*s* of the second end core portion 33*s* is shorter than the length L3*f* of the first end core portion 33*f*. As an alternative to the present embodiment, the length L3*s* and the length L3*f* may be the same.

Among the length L1*f* of the first middle core portion 31*f*, the length L21*f* of the first side core portion 321*f*, and the length L22*f* of the second side core portion 322*f*, at least one of the lengths may be different, or all of the lengths may be the same. Among the length L1*s* of the second middle core portion 31*s*, the length L21*s* of the first side core portion 321*s*, and the length L22*s* of the second side core portion 322*s*, at least one of the lengths may be different, or all of the lengths may be the same. In the present embodiment, the length L21*f* and the length L22*f* are the same, and are longer than the length L1*f*. Also, the length L21*s* and the length L22*s* are the same, and are longer than the length L1*s*.

(Gap Portion)

The gap portion 3*g* is constituted by a member made of a material having a smaller relative magnetic permeability than the first core piece 3*f* and the second core piece 3*s*. In the present embodiment, the gap portion 3*g* is constituted by a portion of the molded resin portion 4, which will be described later. As an alternative to the present embodiment, the gap portion 3*g* may be an air gap. The gap portion 3*g* may be arranged inside the winding portion 21 as in the present embodiment. The gap portion 3*g* of the present embodiment is provided between the first middle core portion 31*f* and the second middle core portion 31*s*. If the gap portion 3*g* is provided inside the winding portion 21, eddy current loss in the winding portion 21 caused by the entrance of leakage magnetic flux into the winding portion 21 can be reduced more easily than in the case of being provided outside the winding portion 21.

[Molded Resin Portion]

The reactor 1 may further include the molded resin portion 4 as shown in FIG. 1. The molded resin portion 4 is not shown in FIG. 3 for convenience in the description. The molded resin portion 4 covers at least portion of the magnetic core 3. The molded resin portion 4 protects the covered portion from the external environment. The molded resin portion 4 may cover the outer surface of the magnetic core 3 and not cover the outer surface of the coil 2, or may cover both the outer surface of the magnetic core 3 and the outer surface of the coil 2.

The molded resin portion 4 of the present embodiment covers the outer surface of an assembly of the coil 2 and the magnetic core 3. The molded resin portion 4 protects the assembly from the external environment. Moreover, the coil 2 and the magnetic core 3 are integrated by the molded resin portion 4. The molded resin portion 4 of the present embodiment is located between the coil 2 and the magnetic core 3, between the first middle core portion 31*f* and the second middle core portion 31*s*, and inside the hole portion 34. The portion of the molded resin portion 4 provided between the first middle core portion 31*f* and the second middle core portion 31*s* constitutes the gap portion 3*g*. The resin of the molded resin portion 4 is the same as the resin of the composite material described above. The resin of the molded resin portion 4 may contain a ceramic filler, similarly to the composite material.

[Other Aspects]

Although not shown, the reactor 1 may include at least any of a case, an adhesive layer, and a holding member, for example. The case houses the assembly of the coil 2 and the magnetic core 3. The assembly in the case may be embedded in a sealing resin portion. An adhesive layer fixes the assembly to a mounting surface, fixes the assembly to an inner bottom surface of the case, and fixes the case to a mounting surface, for example. A holding member is provided between the coil 2 and the magnetic core 3 and ensures insulation between the coil 2 and the magnetic core 3.

[Actions and Effects]

In the reactor 1 of the present embodiment, a crack is less likely to be formed in the first core piece 3*f* due to vibration. The reason is as follows. In the first middle core portion 31*f* in which the radius r1 of the first inscribed circle C1 is less than or equal to 0.6 times the radius r0 of the reference inscribed circle C0, the difference between the solidification rate at the fastest solidifying location and the solidification rate at the slowest solidifying location in the manufacturing process is small. For this reason, a void is less likely to be formed in the first middle core portion 31*f*. Also, the radius r4 of the fourth inscribed circle C4 and the fifth inscribed circle C5 are 0.5 times the radius r0 of the reference inscribed circle C0, and therefore a void is less likely to be formed in the first side core portion 321*f* and the second side core portion 322*f*. Moreover, the radius r6 of the sixth inscribed circle C6 is 0.5 times the radius r0 of the reference inscribed circle C0, and therefore a void is less likely to be formed in the first end core portion 33*f* as well. Therefore, the first core piece 3*f* has few or substantially no voids that act as starting points for the formation of a crack.

Second Embodiment

[Reactor]

Figure 9:
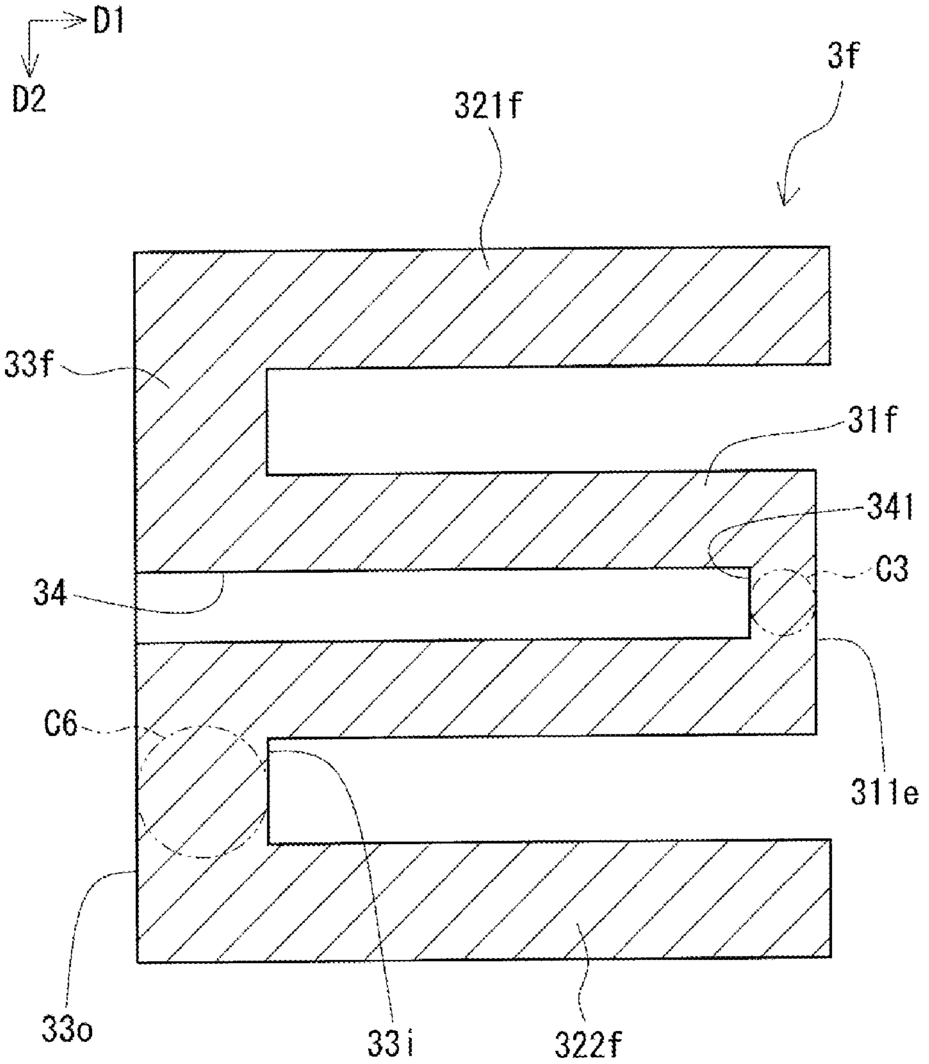
FIG. 9 is a horizontal cross-sectional view of a first core piece provided in a reactor according to a second embodiment.
Figure 10:
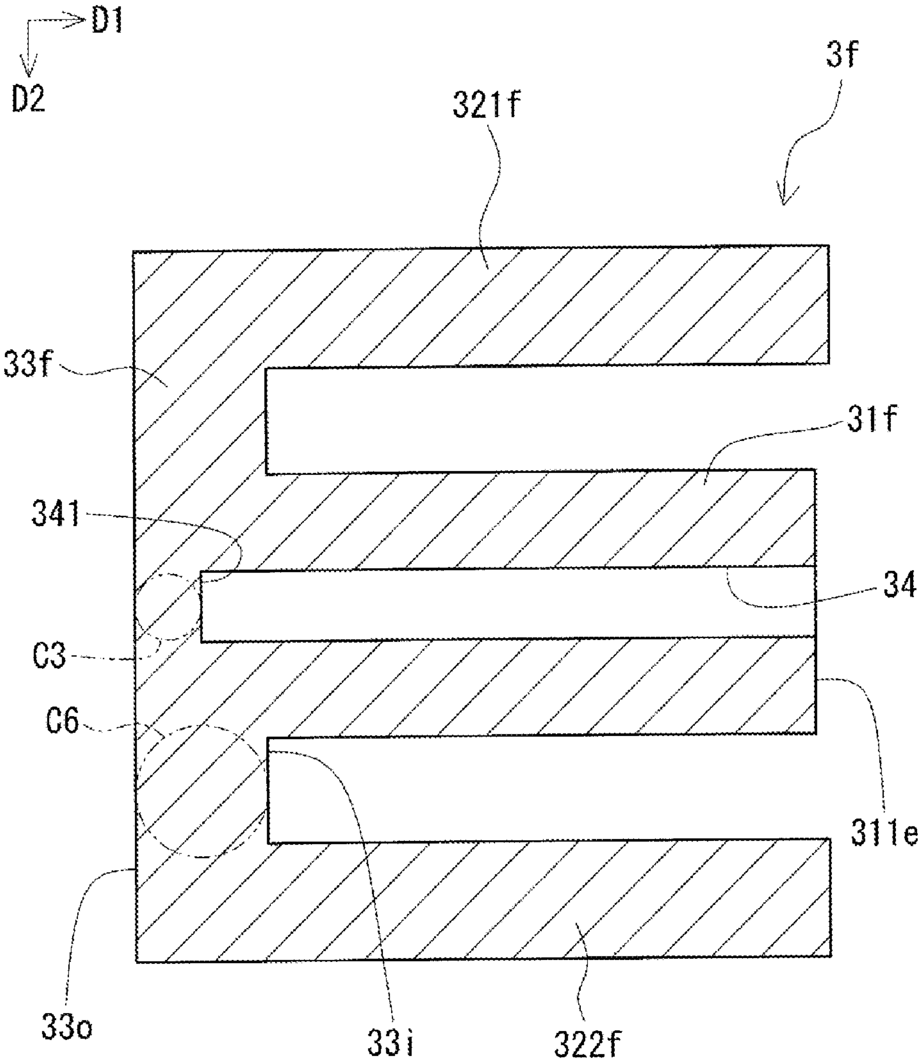
FIG. 10 is a horizontal cross-sectional view of another example of the first core piece provided in the reactor according to the second embodiment.

A reactor according to a second embodiment will be described below with reference to FIGS. 9 and 10. FIGS. 9 and 10 show horizontal cross-sections of the first core piece 3*f* taken at the same position as the horizontal cross-section shown in FIG. 6. The reactor of the present embodiment is different from the reactor 1 of the first embodiment in that the hole portion 34 is a blind hole. In other words, the hole portion 34 has a bottom portion 341. The following description focuses on differences from the first embodiment. Descriptions may be omitted for configurations and effects similar to those of the first embodiment. This similarly applies to a third embodiment, which will be described later.

<Hole Portion>

The hole portion 34 shown in FIG. 9 is continuous from the outward face 33*o* of the first end core portion 33*f* to an intermediate position in the first middle core portion 31*f*. In other words, the opening of the hole portion 34 shown in FIG. 9 is connected to the outward face 33*o*. On the other hand, the hole portion 34 shown in FIG. 10 extends from the end face 311*e* of the first middle core portion 31*f* to an intermediate position in the first end core portion 33*f*. In other words, the opening of the hole portion 34 shown in FIG. 10 is connected to the end face 311*e*.

The length of the hole portion 34 along the first direction D1 may be selected such that at least either a radius r2 of a second inscribed circle or a radius r3 of a third inscribed circle C3 is less than or equal to 0.6 times the radius r0 of the reference inscribed circle C0 described above. Although not shown, the second inscribed circle is the largest inscribed circle in contact with a first surface and the bottom portion 341 of the hole portion 34 in a vertical cross-section of the first core piece 3*f*. The third inscribed circle C3 is the largest inscribed circle in contact with the first surface and the bottom portion 341 of the hole portion 34 in the horizontal cross-section of the first middle core portion 31*f* shown in FIGS. 9 and 10. Although not shown, the second inscribed circle is also the same as the third inscribed circle C3 shown in FIGS. 9 and 10. The first surface is the end face 311*e* of the first middle core portion 31*f* or the outward face 33*o* of the first end core portion 33*f*. In FIG. 9, the first surface is the end face 311*e*. In FIG. 10, the first surface is the outward face 33*o*. In particular, both the radius r2 and the radius r3 may be less than or equal to 0.6 times the radius r0. The preferred ranges of the radius r2 and radius r3 are the same as the preferred range of the radius r1.

Third Embodiment

Figure 11:
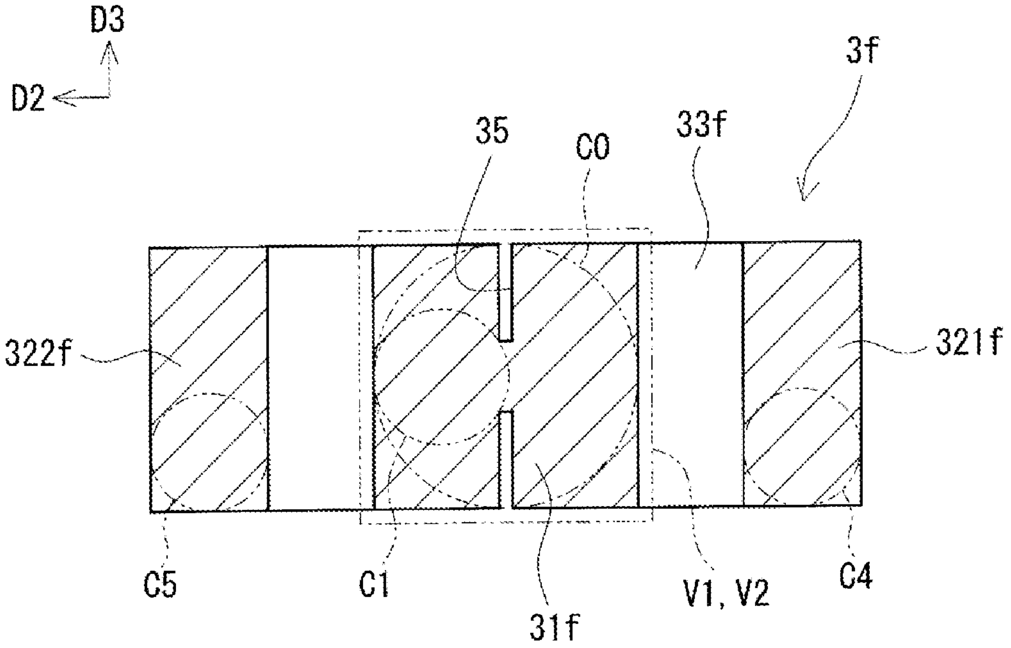
FIG. 11 is a lateral cross-sectional view of a first core piece provided in the reactor according to a third embodiment.
Figure 12:
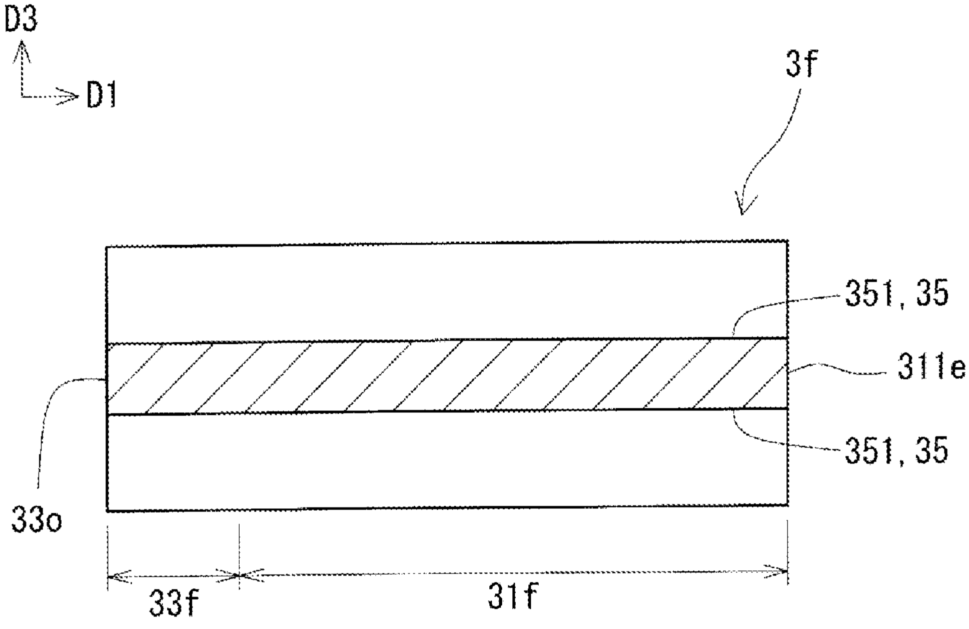
FIG. 12 is a vertical cross-sectional view of the first core piece provided in the reactor according to third embodiment.
Figure 13:
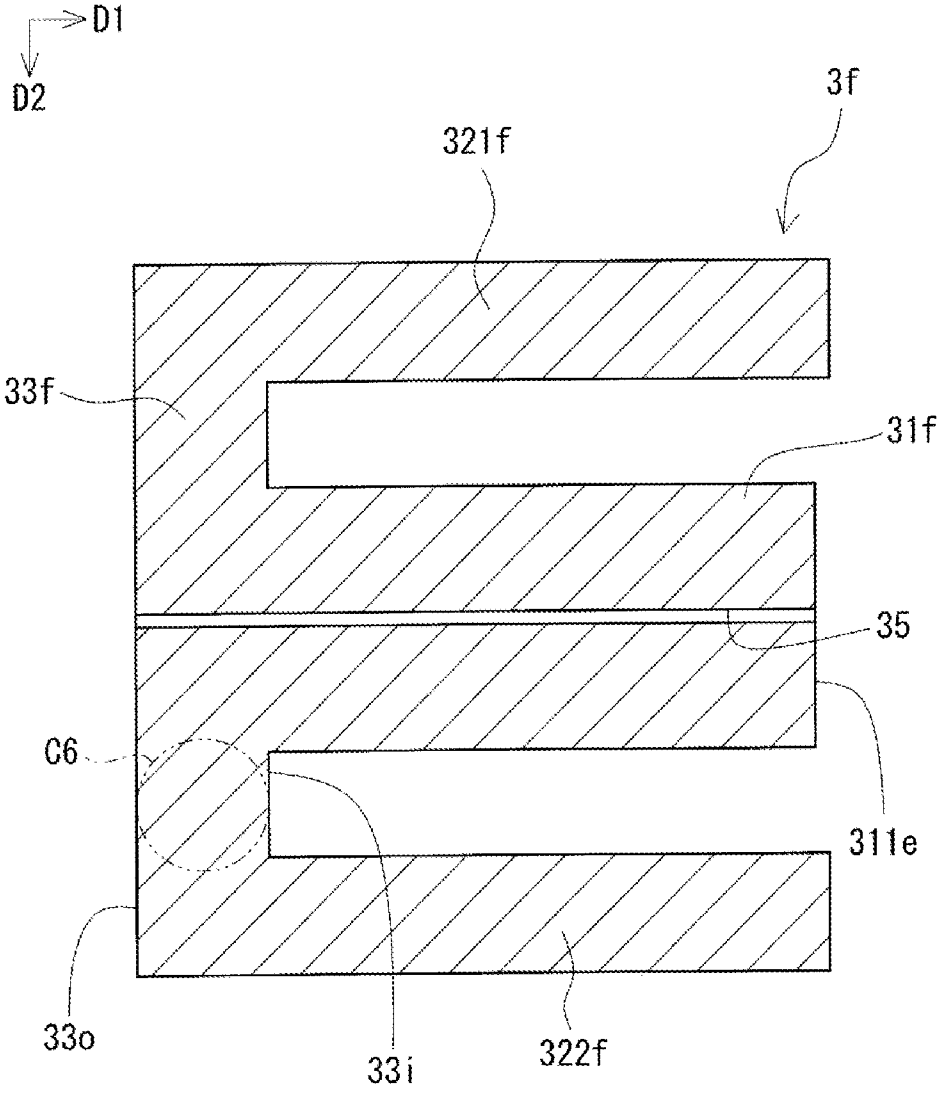
FIG. 13 is a horizontal cross-sectional view of the first core piece provided in the reactor according to the third embodiment.

A reactor according to a third embodiment will be described below with reference to FIGS. 11 to 13. The reactor of the present embodiment is different from the reactor 1 according to the first embodiment mainly in that the first core piece 3*f* has groove portions 35 instead of the hole portion 34. FIG. 11 shows a lateral cross-section of the first core piece 3*f* taken at the same position as the lateral cross-section shown in FIG. 4. FIG. 12 shows a vertical cross-section of the first core piece 3*f* taken at the same position as the vertical cross-section shown in FIG. 5. FIG. 13 shows a horizontal cross-section of the first core piece 3*f* taken at the same position as the horizontal cross-section shown in FIG. 6.

<Groove Portion>

As shown in FIG. 11, each of the groove portions 35 has an opening connected to the outer peripheral face of the first middle core portion 31*f* in the lateral cross-section of the first middle core portion 31*f*. The number of groove portions 35, the depth of the groove portions 35, and the outline shape of the groove portions 35 in the lateral cross-section of the first middle core portion 31*f* can be appropriately selected such that the radius r1 of the first inscribed circle C1 is less than or equal to 0.6 times the radius r0 of the reference inscribed circle C0. The first inscribed circle C1 of the present embodiment is the largest inscribed circle between the peripheral outline and the outlines of the groove portions 35 in the lateral cross-section of the first middle core portion 31*f*. The reference inscribed circle C0 is the largest inscribed circle in the first virtual outline V1 as described above. The first virtual outline V1 includes straight lines that extend across the openings of the groove portions 35 rather than extending along the inward faces of the groove portions 35.

There may be one or a plurality of groove portions 35. In the present embodiment, two groove portions 35 are provided. In the present embodiment, the two groove portions 35 are aligned with each other on the same straight line extending in the third direction D3 in the lateral cross-section of the first middle core portion 31*f*. The lateral cross-section of the first middle core portion 31*f* is H-shaped due to the two groove portions 35. As an alternative to the present embodiment, the two groove portions 35 may be aligned on the same straight line extending in the second direction D2 in the lateral cross-section of the first middle core portion 31*f*.

The depth of the groove portions 35 can be appropriately selected in accordance with the number of groove portions 35. The depth of each of the groove portions 35 is the length from the opening of the groove portion 35 to a bottom portion 351 of the groove portion 35 shown in FIG. 12. In the case where a plurality of groove portions 35 are provided as in the present embodiment, the depth of the groove portions 35 is not required to be a depth according to which the groove portions 35 overlap the center of gravity of the first virtual outline V1. As an alternative to the present embodiment, in the case where one groove portion 35 is provided as in a fourth embodiment described later, the depth of the groove portion 35 may be a depth according to which the groove portion 35 overlaps the center of gravity of the first virtual outline V1. The groove portion 35 overlapping the center of gravity of the first virtual outline V1 means that the outline of the groove portion 35 surrounds the center of gravity of the first virtual outline V1.

The outline shape of the groove portion 35 in the lateral cross-section of the first middle core portion 31*f* is U-shaped, for example.

The inner area S1 of the interior of the groove portion 35 may be less than or equal to 10% of an area S2 of the second virtual outline V2. The inner region of the groove portion 35 is the region surrounded by the outline of the groove portion 35 and the second virtual outline V2. In the case where a plurality of groove portions 35 are provided as in the present embodiment, the area S1 is the sum of the inner areas of the groove portions 35. The preferred range of the inner area S1 of the groove portions 35 is the same as the preferred range of the area S1 of interior of the hole portion 34 described above. Similarly to the first virtual outline V1, the second virtual outline V2 includes straight lines that extend across the openings of the groove portions 35 rather than extending along the inward faces of the groove portions 35. Note that in the case where the lateral cross-sectional shape of the first middle core portion 31*f* is circular, the second virtual outline V2 includes curves that extend across the openings of the groove portions 35.

As shown in FIGS. 12 and 13, the groove portions 35 are elongated in the first direction D1 in the first middle core portion 31*f*. In the present embodiment, as shown in FIGS. 12 and 13, the groove portions 35 are continuous from the end face 311*e* of the first middle core portion 31*f* to the outward face 33*o* of the first end core portion 33*f*. The groove portions 35 of the present embodiment are each constituted by the bottom portion 351, a first side wall portion, and a second side wall portion. The first side wall portion and the second side wall portion connect the bottom portion 351 to the opening. Note that although not shown, the groove portions 35 may extend from the outward face 33*o* to an intermediate position in the first middle core portion 31*f*. Also, the groove portions 35 may extend from the end face 311*e* to an intermediate position in the first end core portion 33*f*, as in a fifth embodiment described later with reference to FIGS. 17 and 18.

The first core piece 3*f* constituted by a composite material molded body is manufactured as described below. Protrusions corresponding to the groove portions 35 described above are provided on the inner peripheral surface of a mold. The raw material for the composite material molded body is poured into the mold, and the raw material resin is solidified.

[Actions and Effects]

In the reactor of the present embodiment, similarly to the first embodiment, a void is less likely to be formed in the first middle core portion 31*f*, the first side core portion 321*f*, the second side core portion 322*f*, and the first end core portion 33*f*, and thus a crack is less likely to be formed in the first core piece 3*f* due to vibration.

Fourth Embodiment

Figure 14:
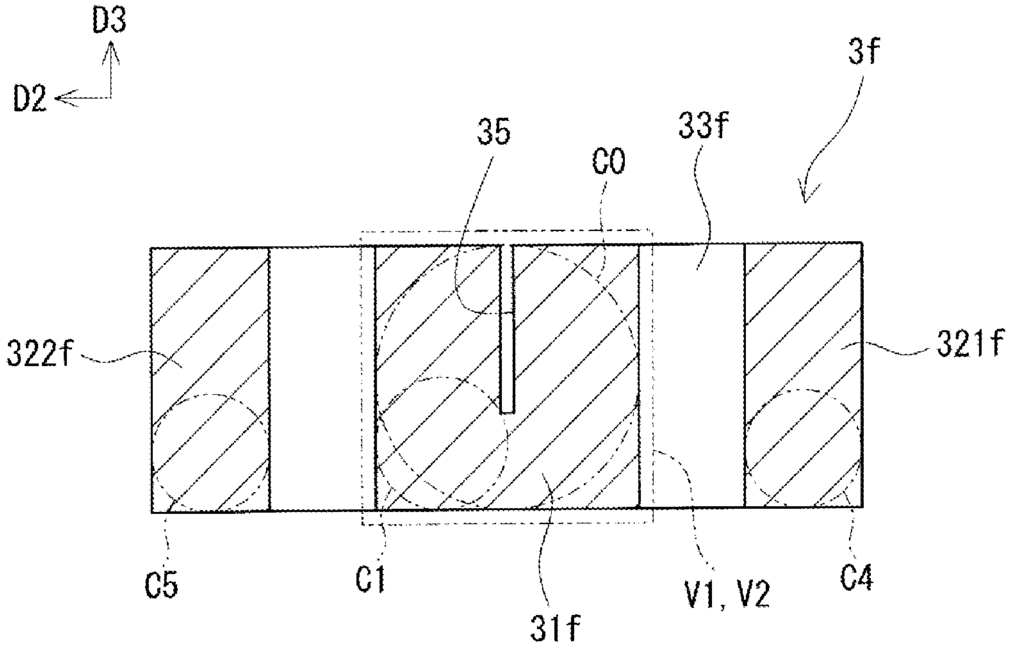
FIG. 14 is a lateral cross-sectional view of a first core piece provided in a reactor according to a fourth embodiment.
Figure 15:
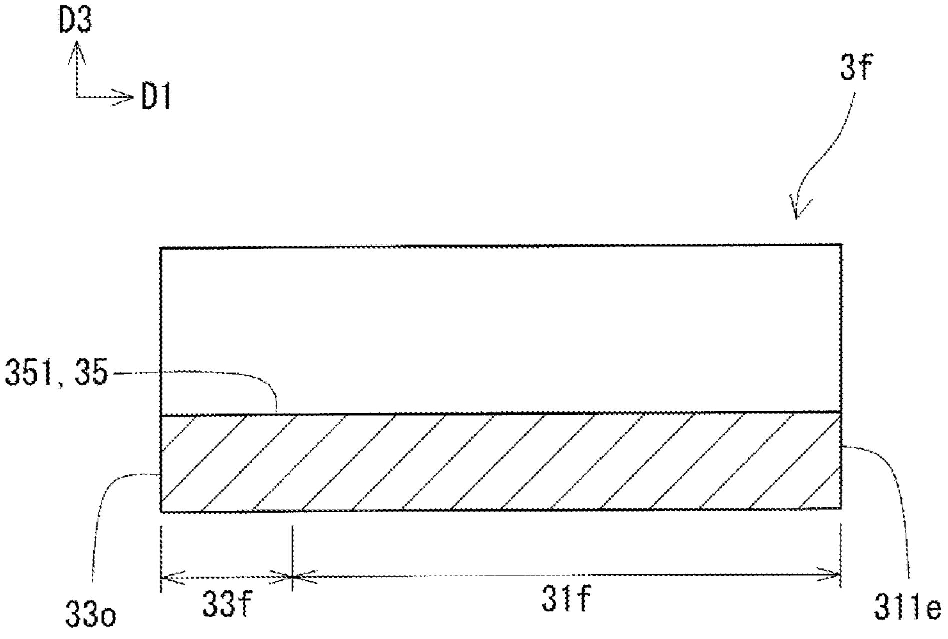
FIG. 15 is a vertical cross-sectional view of the first core piece provided in the reactor according to the fourth embodiment.

A reactor according to a fourth embodiment will be described below with reference to FIGS. 14 and 15. The reactor of the present embodiment is different from the reactor according to the third embodiment mainly in that one groove portion 35 is provided, as shown in FIG. 14. The following description focuses on differences from the third embodiment. Descriptions of configurations and effects similar to those of the third embodiment may be omitted. This similarly applies to a fifth embodiment, which will be described later.

<Groove Portion>

As shown in FIG. 14, one groove portion 35 extends in the third direction D3 of the first middle core portion 31*f* in a portion thereof with respect to the third direction D3. The lateral cross-section of the first middle core portion 31*f* is U-shaped due to the groove portion 35. As shown in FIG. 14, the depth of the groove portion 35 is a depth according to which the groove portion 35 overlaps the center of gravity of the first virtual outline V1. Also in the present embodiment, the groove portion 35 is provided such that the radius r1 of the first inscribed circle C1 is less than or equal to 0.6 times the radius r0 of the reference inscribed circle C0. As shown in FIG. 15, the groove portion 35 extends continuously from the end face 311*e* of the first middle core portion 31*f* to the outward face 33*o* of the first end core portion 33*f*.

Fifth Embodiment

Figure 16:
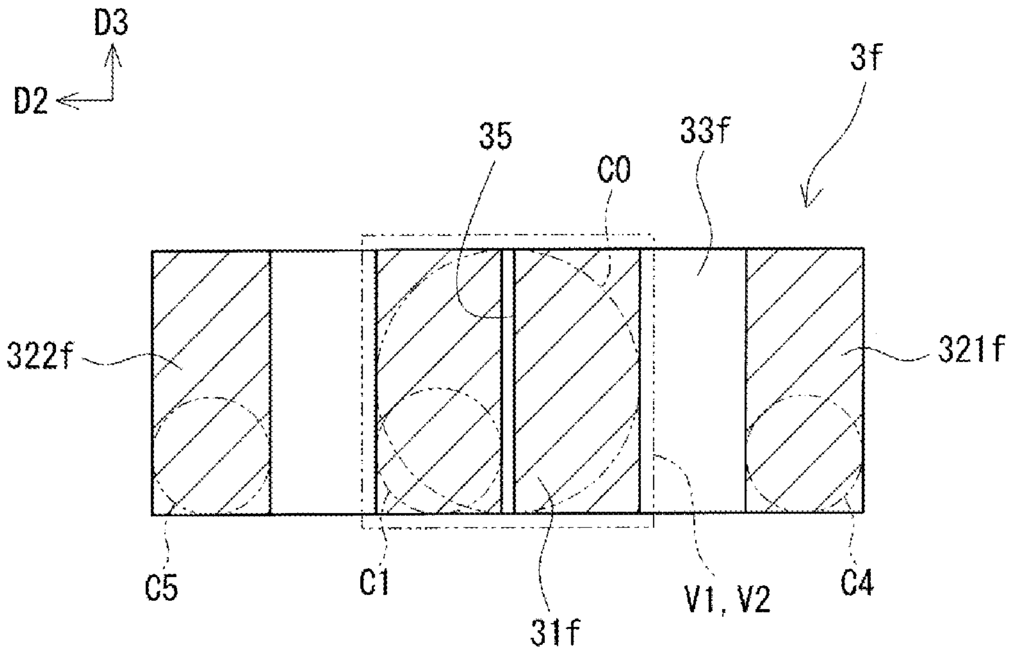
FIG. 16 is a lateral cross-sectional view of a first core piece provided in a reactor according to a fifth embodiment.

A reactor according to a fifth embodiment will be described below with reference to FIGS. 16 to 18. As shown in FIG. 16, the reactor of the present embodiment is different from the reactor according to the third embodiment mainly in that one groove portion 35 is provided.

<Groove Portion>

As shown in FIG. 16, the groove portion 35 extends continuously over the entire length of the first middle core portion 31*f* in the third direction D3. The first middle core portion 31*f* is divided into two parts parallel to each other in the second direction D2. The lateral cross-section of the first middle core portion 31*f* is constituted by two parallel I-shaped portions due to the groove portion 35. As shown in FIGS. 17 and 18, the groove portion 35 extends continuously from the end face 311*e* to an intermediate position in the first end core portion 33*f*. Also in the present embodiment, the groove portion 35 is provided such that the radius r1 of the first inscribed circle C1 is less than or equal to 0.6 times the radius r0 of the reference inscribed circle C0.

Figure 17:
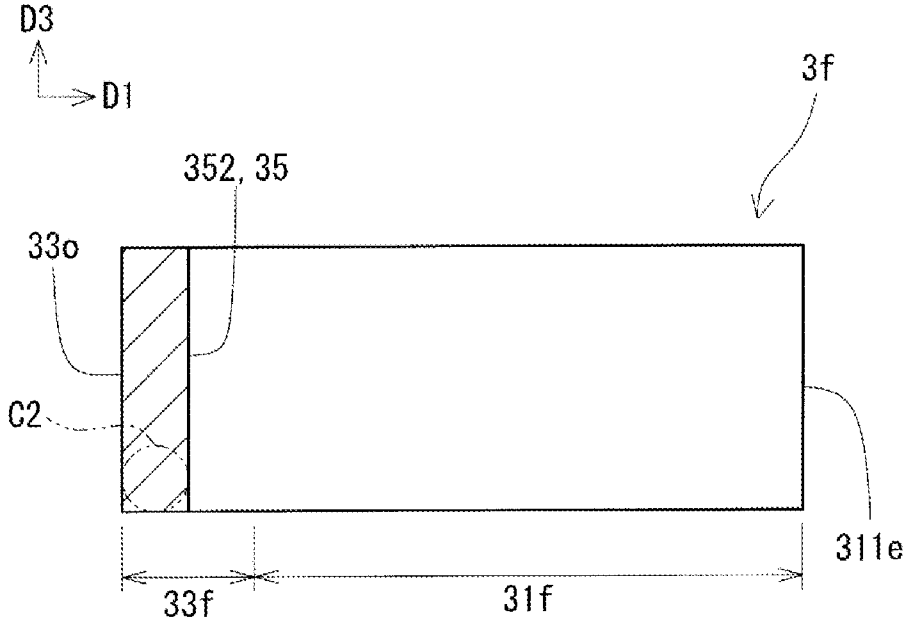
FIG. 17 is a vertical cross-sectional view of the first core piece provided in the reactor according to the fifth embodiment.
Figure 18:
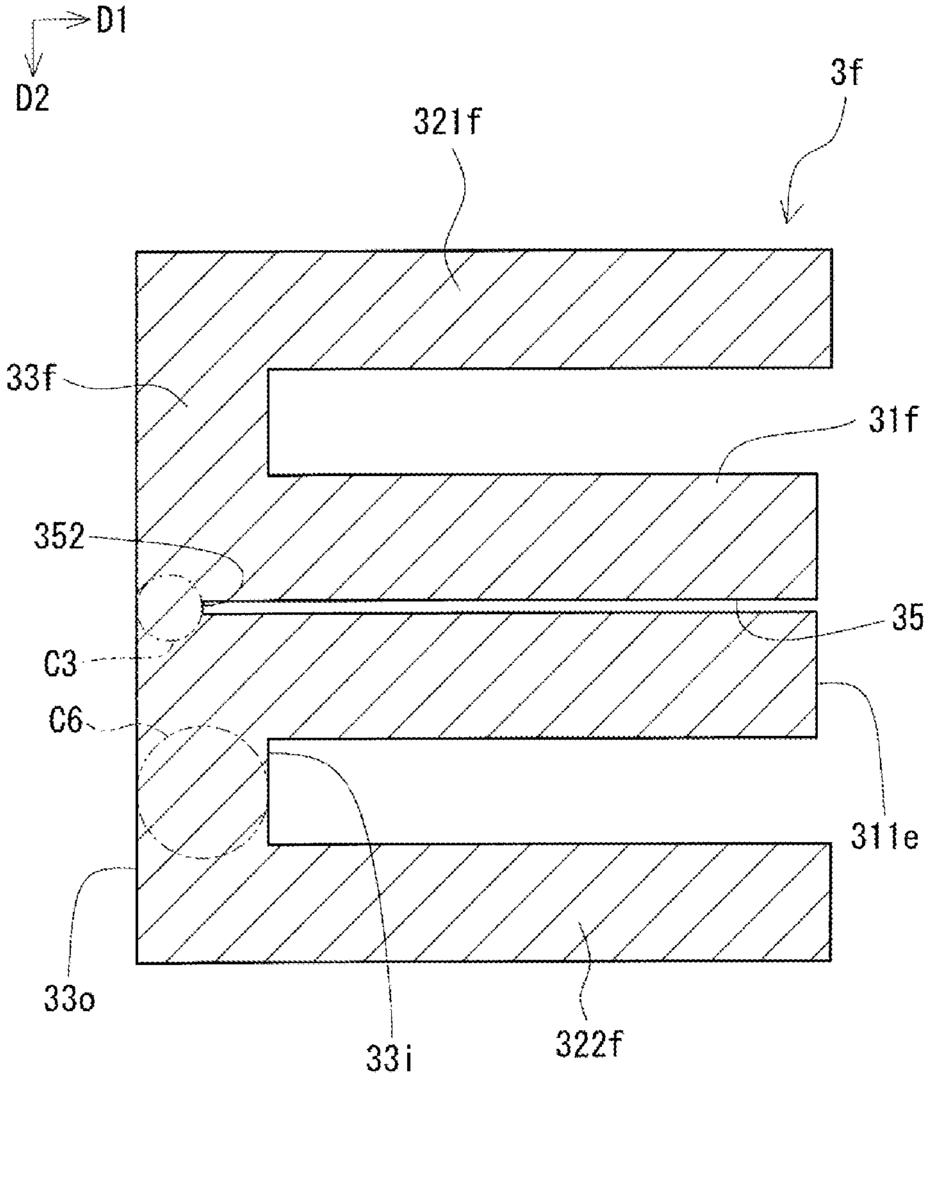
FIG. 18 is a horizontal cross-sectional view of the first core piece provided in the reactor according to the fifth embodiment.

As shown in FIGS. 17 and 18, the groove portion 35 extends from the end face 311*e* of the first middle core portion 31*f* to an intermediate position in the first end core portion 33*f*. The groove portion 35 of the present embodiment is constituted by an end portion 352, a first side wall portion, and a second side wall portion shown in FIGS. 17 and 18. The first side wall portion and the second side wall portion connect the end portion 352 to the end face 311*e*.

The length of the groove portion 35 along the first direction D1 may be selected such that at least either the second inscribed circle C2 or the third inscribed circle C3 is less than or equal to 0.6 times the radius r0 of the reference inscribed circle C0 described above. The second inscribed circle C2 is the largest inscribed circle in contact with a first surface and the end portion 352 of the groove portion 35 in the vertical cross-section of the first core piece 3*f* shown in FIG. 17. The third inscribed circle C3 is the largest inscribed circle in contact with the first surface and the end portion 352 of the groove portion 35 in the horizontal cross-section of the first middle core portion 31*f* shown in FIG. 18. The first surface is the end face 311*e* of the first middle core portion 31*f* or the outward face 33*o* of the first end core portion 33*f*. In FIGS. 17 and 18, the first surface is the outward face 33*o*. In particular, both the radius r2 and the radius r3 may be less than or equal to 0.6 times the radius r0. The preferred ranges of the radius r2 and radius r3 are the same as the preferred range of the radius r1 described above.

Sixth Embodiment

[Converter and Power Conversion Device]

The reactor 1 according to any of the first to fifth embodiments can be used for an application in which the following power conduction conditions are satisfied. Examples of the power conduction conditions include the maximum DC current, the average voltage, and the operating frequency. The maximum DC current is about 100 A or more and 1000 A or less. The average voltage is about 100 V or more and 1000 V or less. The operating frequency is about 5 kHz or more and 100 kHz or less. The reactor 1 according to any of the first to fifth embodiments can be typically used as a component of a converter for installation in a vehicle 1200 shown in FIG. 19, or a component of a power conversion device that includes that converter. The vehicle 1200 is an electric automobile or a hybrid automobile.

Figure 19:
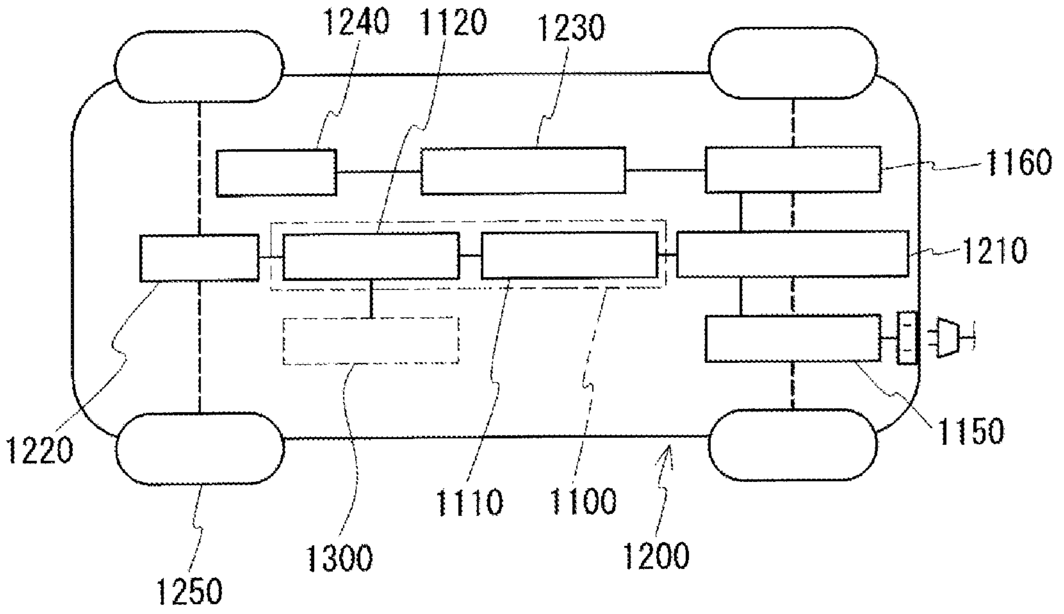
FIG. 19 is a configuration diagram schematically showing a power supply system of a hybrid automobile.

The vehicle 1200 includes a main battery 1210, a power conversion device 1100, and a motor 1220, as shown in FIG. 19. The power conversion device 1100 is connected to the main battery 1210. The motor 1220 is driven by electric power supplied from the main battery 1210 and used for traveling. The motor 1220 is typically a three-phase AC motor. The motor 1220 drives wheels 1250 during traveling, and functions as a generator during regeneration. In the case of a hybrid automobile, the vehicle 1200 includes an engine 1300 in addition to the motor 1220. Although an inlet is shown as the charging location of the vehicle 1200 in FIG. 19, an aspect is also possible in which a plug is included.

The power conversion device 1100 includes a converter 1110 and an inverter 1120. The converter 1110 is connected to the main battery 1210. The inverter 1120 performs conversion between direct current and alternating current. The inverter 1120 is connected to the converter 1110. During traveling of the vehicle 1200, the converter 1110 shown in this example steps up the input voltage from the main battery 1210 from approximately 200 V to 300 V to approximately 400 V to 700 V, and supplies the stepped-up power to the inverter 1120. During regeneration, the converter 1110 steps down the input voltage that is output from the motor 1220 via the inverter 1120 to a DC voltage suitable for the main battery 1210, and charges the main battery 1210 with the DC voltage. The input voltage is a DC voltage. During traveling of the vehicle 1200, the inverter 1120 converts the direct current boosted by the converter 1110 into a predetermined alternating current, and supplies the alternating current to the motor 1220, and during regeneration, the inverter 1120 converts the alternating current output from the motor 1220 into direct current, and outputs the direct current to the converter 1110.

Figure 20:
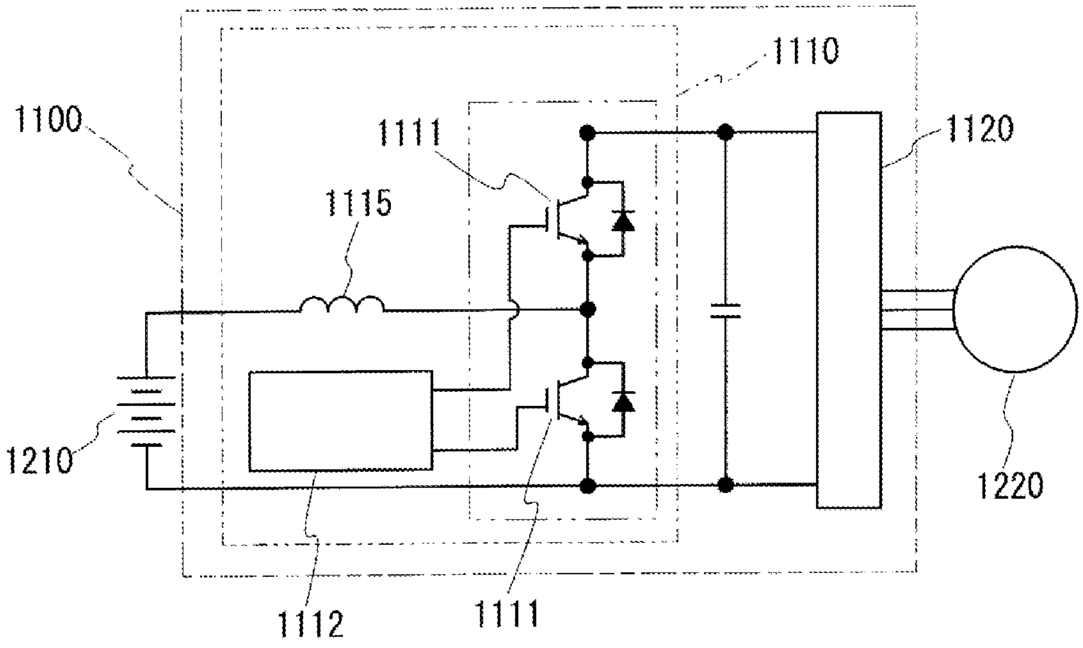
FIG. 20 is a circuit diagram showing an overview of an example of a power conversion device that includes a converter.

The converter 1110 includes a plurality of switching elements 1111, a drive circuit 1112, and a reactor 1115 as shown in FIG. 20. The drive circuit 1112 controls the operation of the switching elements 1111. The converter 1110 converts performs input voltage conversion by repeatedly turning the switching elements ON and OFF. Input voltage conversion means stepping up and stepping down in this case. A power device such as a field effect transistor or an insulated gate bipolar transistor is used for the switching elements 1111. The reactor 1115 has a function of utilizing the property of a coil that attempts to prevent change in the current flowing through a circuit to smooth change in the current when the current increases or decreases due to the switching operation. The reactor 1115 is the reactor 1 according to any of the first to fifth embodiments. The power conversion device 1100 and the converter 1110 that include the reactor 1 have stable performance.

The vehicle 1200 includes a power supply device converter 1150 and an auxiliary power supply converter 1160, in addition to the converter 1110. The power supply device converter 1150 is connected to the main battery 1210. The auxiliary power supply converter 1160 is connected to a sub battery 1230, which serves as a power source for auxiliary devices 1240, and is connected to the main battery 1210. The auxiliary power supply converter 1160 converts high voltage from the main battery 1210 to low voltage, and the converter 1110 typically performs DC-DC conversion. The power supply device converter 1150 and the auxiliary power supply converter 1160 perform AC-DC conversion. Some power supply converters 1150 perform DC-DC conversion. The reactor of the power supply device converter 1150 and the auxiliary power supply converter 1160 has a configuration similar to that of the reactor 1 according to any of the first to fifth embodiments, and the size, shape, and the like of the reactor can be changed appropriately. Also, the reactor 1 according to any of the first to fifth embodiments can be used in a converter that performs conversion on input power but performs only either stepping up or stepping down.

Test Examples

The existence of cracks and voids in various core pieces was examined along with reactor characteristics.

[Samples No. 1 to No. 5]

The core pieces of Samples No. 1 to No. 5 were E-shaped core pieces with hole portions, similarly to the configuration in the first embodiment described with reference to FIGS. 2 to 6. The core piece of each sample was manufactured by injection molding. Injection molding is a method of producing a core piece by filling a mold with a raw material for a composite material molded body under a predetermined pressure. A cylindrical core was placed inside the mold. The length of the core was set such that the hole portion of the obtained core piece is a through hole. The diameter of the core was changed as appropriate.

The hole portion in the core piece of each sample was a through hole. The hole portion extended continuously from the end face of the first middle core portion to the outward face of the first end core portion. The outline shape of the hole portion of each sample was a perfect circle. The diameter of the hole portion was set differently for each sample as shown in Table 1 by changing the diameter of the core. The first virtual outline was a square. The second virtual outline was a square. The length of one side of the first virtual outline was 30 mm Table 1 shows the ratio r1/r0 of the radius r1 of the first inscribed circle to the radius r0 of the reference inscribed circle. Table 1 shows the ratio (S1/S2)×100 of the inner area S1 of the hole portion to the area S2 of the second virtual outline.

[Samples No. 11 to No. 16]

The core pieces of Samples No. 11 to No. 16 are E-shaped core pieces with groove portions, similarly to the third embodiment described with reference to FIGS. 11 to 13. The core pieces of these samples were manufactured by injection molding, similarly to Sample No. 1. Protrusions were provided on the inner peripheral surface of the mold. Two protrusions were provided. The protrusions were provided such that the end faces of the protrusions face each other. The length of the protrusions was set such that the groove portions of the obtained core piece extended continuously from the end face of the first middle core portion to the outward face of the first end core portion. The width and height of the protrusions were changed as appropriate.

The lateral cross-sectional shape of the first middle core portion in the core piece of each sample was H-shaped. The groove portions of the core piece of each sample extended continuously from the end face of the first middle core portion to the outward face of the first end core portion. The groove portions were U-shaped. The width and depth of the groove portions were set differently as shown in Table 2 by changing the width and height of the protrusions. The first virtual outline was a square. The second virtual outline was a square. The length of one side of the first virtual outline was 30 mm Table 2 shows the ratio r1/r0 of the radius r1 of the first inscribed circle to the radius r0 of the reference inscribed circle. Table 2 shows the ratio (S1/S2)×100 of the inner area S1 of the groove portion to the area S2 of the second virtual outline.

[Sample No. 17]

The core piece of Sample No. 17 was manufactured similarly to the core piece of Sample No. 16, with the exception that the hole portion and the groove portion were omitted. Due to having neither a hole portion nor a groove portion, the mark "-" is shown in the "groove width", "groove depth", and "(S1/S2)×100" columns for Sample No. 17 in Table 2.

[Voids and Cracks]

The core pieces of the samples were evaluated with respect to the presence or absence of voids and cracks. The results are shown in Tables 1 and 2. The meanings of A, B, C, and D shown in Tables 1 and 2 are as follows. Here, "A" means having neither voids nor cracks. Also, "B" means that the ratio of the volume of voids to the volume of the core piece is 1% or less, and no cracks were formed. Furthermore, "C" means that the ratio of the volume of voids to the volume of the core piece is more than 1% and 2% or less, and the ratio of the length of a crack to the length of the cracked portion of the core piece is 10% or less. This length is the length in the second direction D2 or the third direction D3, namely whichever the lengthwise direction of the crack conforms to. For example, if the crack extends along the second direction D2, the ratio of the length of the crack along the second direction D2 to the length of the cracked portion of the core piece along the second direction D2 is 10% or less. Moreover, "D" means that the ratio of the volume of voids to the volume of the core piece is more than 2%, and the ratio of the length of a crack to the length of the cracked portion of the core piece is more than 10%. The volume of voids is a value estimated from the ratio of the measured density of the core piece determined by the Archimedes method to the designed density of the core piece. The designed density refers to the density obtained from the mass and volume of the core piece assuming that neither voids nor cracks have formed.

[Reactor Characteristic]

Reactors of the first embodiment described with reference to FIG. 1 were constructed using the core pieces of the samples. Change in inductance was calculated by three-dimensional magnetic field analysis as the reactor characteristic of the samples. Commercially available CAE (Computer Aided Engineering) software was used for the analysis. The reference value for the inductance value was the inductance value of a reactor including core pieces that had neither hole portions nor groove portions and also had neither voids nor cracks. The inductance value of each sample was determined, and the extent of reduction in inductance relative to the reference value was determined for each sample. For the inductance, the amplitude of the applied current was set to 20 A (±20 A). The results are shown in Tables 1 and 2. The meanings of A, B, C, and D shown in Tables 1 and 2 are as follows. Here, "A" means that the extent of reduction of 2% or less. Also, "B" means that the extent of reduction is more than 2% and 5% or less. Furthermore, "C" means that the extent of reduction is more than 5% and 10% or less. Moreover, "D" means that the extent of reduction is more than 10%.

TABLE 1

| Sample No. | Hole diameter mm | r1/r0 | (S1/S2) × 100 % | Crack/void | Reactor characteristic |
|---|---|---|---|---|---|
| 1 | 3 | 0.544 | 0.80 | B | A |
| 2 | 5 | 0.517 | 2.18 | B | B |
| 3 | 8 | 0.475 | 5.59 | B | C |
| 4 | 10 | 0.448 | 8.73 | A | C |
| 5 | 12 | 0.42 | 12.57 | A | D |

TABLE 2

| Sample No. | Groove width mm | Groove depth mm | r1/r0 | (S1/S2) × 100 % | Crack/void | Reactor characteristic |
|---|---|---|---|---|---|---|
| 11 | 1 | 5 | 0.713 | 1.11 | D | A |
| 12 | 1 | 7 | 0.596 | 1.56 | C | A |
| 13 | 1 | 10 | 0.541 | 2.22 | B | B |
| 14 | 3 | 5 | 0.697 | 3.33 | D | B |
| 15 | 3 | 7 | 0.571 | 4.67 | B | B |
| 16 | 3 | 10 | 0.512 | 6.67 | B | C |
| 17 | — | — | 1 | 0 | D | A |

The core pieces of Samples No. 1 to No. 5 had fewer voids and cracks than the core piece of Sample No. 17. The core piece of Sample No. 1 had a small extent of reduction in inductance approximately the same as that of the core piece of Sample No. 17. The core pieces of Sample No. 2 to No. 4 had a relatively small extent of reduction in inductance.

The core pieces of Sample No. 12, Sample No. 13, Sample No. 15, and Sample No. 16 had fewer voids and cracks than the core piece of Sample No. 17. The core piece of Sample No. 12 had a small extent of reduction in inductance approximately the same as that of the core piece of Sample No. 17. The core pieces of Sample No. 13, Sample No. 15, and Sample No. 16 had a relatively small extent of reduction in inductance.

The present invention is not intended to be limited to these examples, but rather is indicated by the scope of the claims, and is intended to include all modifications within the meaning and scope of equivalents of the scope of the claims. For example, in the first to fifth embodiments, the second core piece may be constituted by a laminate body. The laminate body is formed by laminating a plurality of magnetic thin plates. The magnetic thin plates have an insulating coating. The magnetic thin plates are electromagnetic steel plates, for example.

LIST OF REFERENCE NUMERALS

1 reactor
2 coil, 21 winding portion, 21*a* first end portion, 21*b* second end portion
3 magnetic core, 3*f* first core piece, 3*s* second core piece
31 middle core portion
31*f* first middle core portion, 31*s* second middle core portion
311*e*, 312*e* end face
321 first side core portion
321*f* first side core portion, 321*s* first side core portion
322 second side core portion
322*f* second side core portion, 322*s* second side core portion
33*f* first end core portion, 33*s* second end core portion
33*i* inward face, 33*o* outward face
34 hole portion, 341 bottom portion
35 groove portion, 351 bottom portion, 352 end portion
3*g* gap portion
4 molded resin portion
C0 reference inscribed circle, C1 first inscribed circle, C2 second inscribed circle
C3 third inscribed circle, C4 fourth inscribed circle, C5 fifth inscribed circle
C6 sixth inscribed circle
V1 first virtual outline, V2 second virtual outline
D1 first direction, D2 second direction, D3 third direction
L1*f*, L1*s*, L11*f*, L11*s*, L12*f*, L12*s* length
L21*f*, L21*s* length, L22*f*, L22*s* length
L3*f*, L3*s* length, Lg length
1100 power conversion device, 1110 converter
1111 switching element, 1112 drive circuit
1115 reactor, 1120 inverter
1150 power supply device converter, 1160 auxiliary power supply converter
1200 vehicle, 1210 main battery
1220 motor, 1230 sub battery
1240 auxiliary device, 1250 wheel, 1300 engine

What is claimed is:

1. A core piece constituted by a molded body of a composite material in which a soft magnetic powder is dispersed in a resin, the core piece comprising:

a middle core portion configured to be arranged inside a coil; and an end core portion configured to face an end face of the coil, wherein the middle core portion includes a groove portion extending in an axial direction of the coil, a lateral cross-section of the middle core portion is H-shaped or U-shaped or constituted by two parallel I-shaped portions, and in the lateral cross-section of the middle core portion, a radius of a first inscribed circle is less than or equal to 0.6 times a radius of a reference inscribed circle, the lateral cross-section being a cross-section of the middle core portion passing through the groove portion along a plane orthogonal to the axial direction of the coil, the first inscribed circle being a largest inscribed circle between an outline of the groove portion in the lateral cross-section and a peripheral outline of the middle core portion in the lateral cross-section, the reference inscribed circle being a largest inscribed circle in a first virtual outline, and the first virtual outline being a smallest quadrilateral circumscribing the lateral cross-section.

2. A core piece constituted by a molded body of a composite material in which a soft magnetic powder is dispersed in a resin, the core piece comprising:

a middle core portion configured to be arranged inside a coil; and an end core portion configured to face an end face of the coil, wherein the middle core portion includes a hole portion or a groove portion extending in an axial direction of the coil, the hole portion or the groove portion extends continuously from an end face of the middle core portion to an intermediate position in the end core portion, or extends continuously from an outward face of the end core portion to an intermediate position in the middle core portion, in a lateral cross-section of the middle core portion, a radius of a first inscribed circle is less than or equal to 0.6 times a radius of a reference inscribed circle, and in a horizontal cross-section of the core piece, a radius of a third inscribed circle is less than or equal to 0.6 times the radius of the reference inscribed circle, the lateral cross-section being a cross-section of the middle core portion passing through the hole portion or the groove portion along a plane orthogonal to the axial direction of the coil, the horizontal cross-section being a cross-section of the core piece passing through the hole portion or the groove portion along a plane orthogonal to a plan view direction of the core piece, the first inscribed circle being a largest inscribed circle between an outline of the hole portion or the groove portion in the lateral cross-section and a peripheral outline of the middle core portion in the lateral cross-section, the reference inscribed circle being a largest inscribed circle in a first virtual outline, the first virtual outline being a smallest quadrilateral circumscribing the lateral cross-section, and the third inscribed circle being a largest inscribed circle in contact with the end face of the middle core portion and either a bottom portion of the hole portion or an end portion of the groove portion in the horizontal cross-section, or a largest inscribed circle in contact with the outward face of the end core portion and either the bottom portion of the hole portion or the end portion of the groove portion in the horizontal cross-section.

3. The core piece according to claim 1, wherein an inner area of the groove portion in the lateral cross-section is less than or equal to 10% of an area of a second virtual outline, the second virtual outline being a smallest shape enclosing the lateral cross-section.

4. The core piece according to claim 1, wherein the groove portion overlaps a center of gravity of the first virtual outline.

5. The core piece according to claim 1, wherein the groove portion extends continuously from an end face of the middle core portion to an outward face of the end core portion.

6. The core piece according to claim 1, wherein the groove portion extends continuously from an end face of the middle core portion to an intermediate position in the end core portion, or extends continuously from an outward face of the end core portion to an intermediate position in the middle core portion, and in a vertical cross-section of the core piece, a radius of a second inscribed circle is less than or equal to 0.6 times the radius of the reference inscribed circle, the vertical cross-section being a cross-section of the core piece passing through the groove portion along a plane orthogonal to a side view direction of the core piece, and the second inscribed circle being a largest inscribed circle in contact with the end face of the middle core portion and an end portion of the groove portion in the vertical cross-section, or a largest inscribed circle in contact with the outward face of the end core portion and the end portion of the groove portion in the vertical cross-section.

7. The core piece according to claim 1, wherein the groove portion extends continuously from an end face of the middle core portion to an intermediate position in the end core portion, or extends continuously from an outward face of the end core portion to an intermediate position in the middle core portion, and in a horizontal cross-section of the core piece, a radius of a third inscribed circle is less than or equal to 0.6 times the radius of the reference inscribed circle, the horizontal cross-section being a cross-section of the core piece passing through the groove portion along a plane orthogonal to a plan view direction of the core piece, and the third inscribed circle being a largest inscribed circle in contact with the end face of the middle core portion and an end portion of the groove portion in the horizontal cross-section, or a largest inscribed circle in contact with the outward face of the end core portion and the end portion of the groove portion in the horizontal cross-section.

8. The core piece according to claim 2, wherein an inner area of the hole portion or the groove portion in the lateral cross-section is less than or equal to 10% of an area of a second virtual outline, the second virtual outline being a smallest shape enclosing the lateral cross-section.

9. The core piece according to claim 2, wherein the hole portion or the groove portion overlaps a center of gravity of the first virtual outline.

10. The core piece according to claim 2, wherein the middle core portion includes the hole portion, and an outline shape of the hole portion is a circular shape or a polygonal shape.

11. The core piece according to claim 2, wherein in a vertical cross-section of the core piece, a radius of a second inscribed circle is less than or equal to 0.6 times the radius of the reference inscribed circle, the vertical cross-section being a cross-section of the core piece passing through the hole portion or the groove portion along a plane orthogonal to a side view direction of the core piece, and the second inscribed circle being a largest inscribed circle in contact with the end face of the middle core portion and either a bottom portion of the hole portion or an end portion of the groove portion in the vertical cross-section, or a largest inscribed circle in contact with the outward face of the end core portion and either the bottom portion of the hole portion or the end portion of the groove portion in the vertical cross-section.

12. A reactor comprising:

a coil; and a magnetic core, wherein the coil includes one winding portion, the magnetic core is a compound body that is a combination of a first core piece and a second core piece, and at least either the first core piece or the second core piece is the core piece according to claim 1.

13. A converter comprising the reactor according to claim 12.

14. A power conversion device comprising the converter according to claim 13.

* * * * *